United States Patent
Bryar et al.

(10) Patent No.: US 8,302,011 B2
(45) Date of Patent: Oct. 30, 2012

(54) TECHNIQUE FOR MODIFYING PRESENTATION OF INFORMATION DISPLAYED TO END USERS OF A COMPUTER SYSTEM

(75) Inventors: Colin Bryar, Seattle, WA (US); Jonathan Leblang, Menlo Park, CA (US); Udi Manber, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 648 days.

(21) Appl. No.: 11/127,057

(22) Filed: May 10, 2005

(65) Prior Publication Data

US 2006/0168510 A1 Jul. 27, 2006

Related U.S. Application Data

(60) Provisional application No. 60/646,753, filed on Jan. 24, 2005.

(51) Int. Cl.
G06F 17/00 (2006.01)

(52) U.S. Cl. .......................... 715/736; 715/751; 715/854

(58) Field of Classification Search .................. 715/513, 715/736, 202, 230, 231, 233, 234; 707/2; 705/26, 27; 345/173; 709/206
See application file for complete search history.

(56) References Cited

U.S. PATENT DOCUMENTS

| | | | | |
|---|---|---|---|---|
| 5,860,071 | A | 1/1999 | Ball et al. ...................... | 707/100 |
| 6,249,795 | B1 | 6/2001 | Douglis ........................ | 707/511 |
| 6,282,548 | B1 | 8/2001 | Burner et al. | |
| 6,366,933 | B1 | 4/2002 | Ball et al. ..................... | 707/511 |
| 6,596,030 | B2 | 7/2003 | Ball et al. ..................... | 715/511 |
| 2002/0120648 | A1* | 8/2002 | Ball et al. ..................... | 715/229 |
| 2003/0009563 | A1 | 1/2003 | Douglis et al. ................ | 709/227 |

(Continued)

FOREIGN PATENT DOCUMENTS

JP 2001-034525 A 2/2001

(Continued)

OTHER PUBLICATIONS

Ball et al. "Tracking and Viewing Changes on the Web" Published 1996 by AT&T Bell Lab [USENIX Technical Conference] pp. 1-13.*

(Continued)

*Primary Examiner* — Cesar Paula
*Assistant Examiner* — Quoc A Tran
(74) *Attorney, Agent, or Firm* — Novak Druce + Quigg LLP

(57) ABSTRACT

A technique is described for facilitating a display of markup document content retrieved from a host server on a computer network including a client system and a server system. A first portion of content relating to a first markup document may be displayed to a user of the client system, wherein the first markup document has a URL associated therewith. Information relating to the first portion of content is stored at the server system. An action to display a current version of the first markup document on the client system is received. A current version of content for the first markup document is retrieved from the host server. The stored information relating to the first portion of content may be used to identify a third portion of content associated with the first markup document which has not previously been displayed to the user. The display of markup document content associated with the first markup document may then be modified in a manner which facilitates the user in identifying the third portion of content.

51 Claims, 15 Drawing Sheets

U.S. PATENT DOCUMENTS

| | | | |
|---|---|---|---|
| 2003/0226106 A1* | 12/2003 | McKellar et al. | 715/513 |
| 2004/0261009 A1 | 12/2004 | Torigoe et al. | |
| 2005/0033657 A1* | 2/2005 | Herrington et al. | 705/26 |
| 2005/0050044 A1* | 3/2005 | Takagi et al. | 707/6 |
| 2005/0289468 A1* | 12/2005 | Kahn et al. | 715/738 |
| 2006/0004703 A1* | 1/2006 | Spivack et al. | 707/2 |
| 2006/0101035 A1* | 5/2006 | Mustakallio et al. | 707/100 |
| 2006/0112178 A1* | 5/2006 | Van Vleet et al. | 709/224 |
| 2006/0282445 A1* | 12/2006 | Chen et al. | 707/100 |
| 2008/0086692 A1* | 4/2008 | Berstis et al. | 715/736 |

FOREIGN PATENT DOCUMENTS

| | | |
|---|---|---|
| JP | 2001-249874 A | 9/2001 |
| JP | 2002-055870 A | 2/2002 |
| JP | 2003-108464 A | 4/2003 |
| JP | 2004-013565 A | 1/2004 |

OTHER PUBLICATIONS

Ball et al. [Non-Patent Literature] "The AT&T Internet Difference Engine: Tracking and Viewing Changes on the Web" Published Jan. 1998- pp. 1-29.*

Ball et al. "The AT&T Internet Difference Engine: Tracking and Viewing Changes on the Web" Published Jan. 1998- pp. 1-29 [hereinafter "Ball"].*

Van Vleet, et al., "Server Architecture and Methods for Persistently Storing and Serving Event Data".

"Automatically Identifying Links Displayed by a Browser that is Being Used by a User that Point to Pages of Web Sites Selected as Being of Interest to the User".

"Search Engine System..".

Allen, M.B., "A Generic Implementation of the Myers SES/LCS Algorithm With the Hirschberg Linear Space Refinement," © Michael B. Allen, <http://www.ioplex.com/~miallen/limba/dl/src/diff.c>[retrieved Feb. 7, 2006], 6 pages.

Hammersley, B., *Content Syndication With RSS*, O'Reilly & Associates, Sebastopol, California, 2003.

Hunt, J.W., and M.D. McIlroy, "An Algorithm for Differential File Comparison," *Computer Science Technical Report 41*, Bell Laboratories, Murray Hill, New Jersey, Jul. 1976.

MacKenzie, D., et al., "Comparing and Merging Files," Free Software Foundation, Inc., May 9, 2002, <http://www.gnu.org/software/diffutils/manual/html_mono/diff.html>[retrieved Feb. 7, 2006].

Myers, E., "An O($ND$) Difference Algorithm and Its Variations," *Algorithmica 1* (2):251-266, 1986.

Nottingham, M., "The Atom Syndication Format 0.3 (Pre-Draft): Draft-Nottingham-Atom-Format-02," Dec. 2003, <http://www.mnot.net/drafts/draft-nottingham/atom-format-02.html>[retrieved Feb. 7, 2006].

Ball, T. et al., "An Internet Difference Engine and its Applications," *Digest of Papers of the Computer Society Computer Conference Compcon*, 1:71-76 (1996).

Douglis, F. et al., "The AT&T internet Difference Engine: Tracking and Viewing Changes on the Web," retrieved from www.research.att.com/resources/trs, pp. 1-24 (1997).

Douglis, F. et al., "The AT&T internet Difference Engine: Tracking and Viewing Changes on the Web," World Wide Web, 1:1-29 (1998).

* cited by examiner

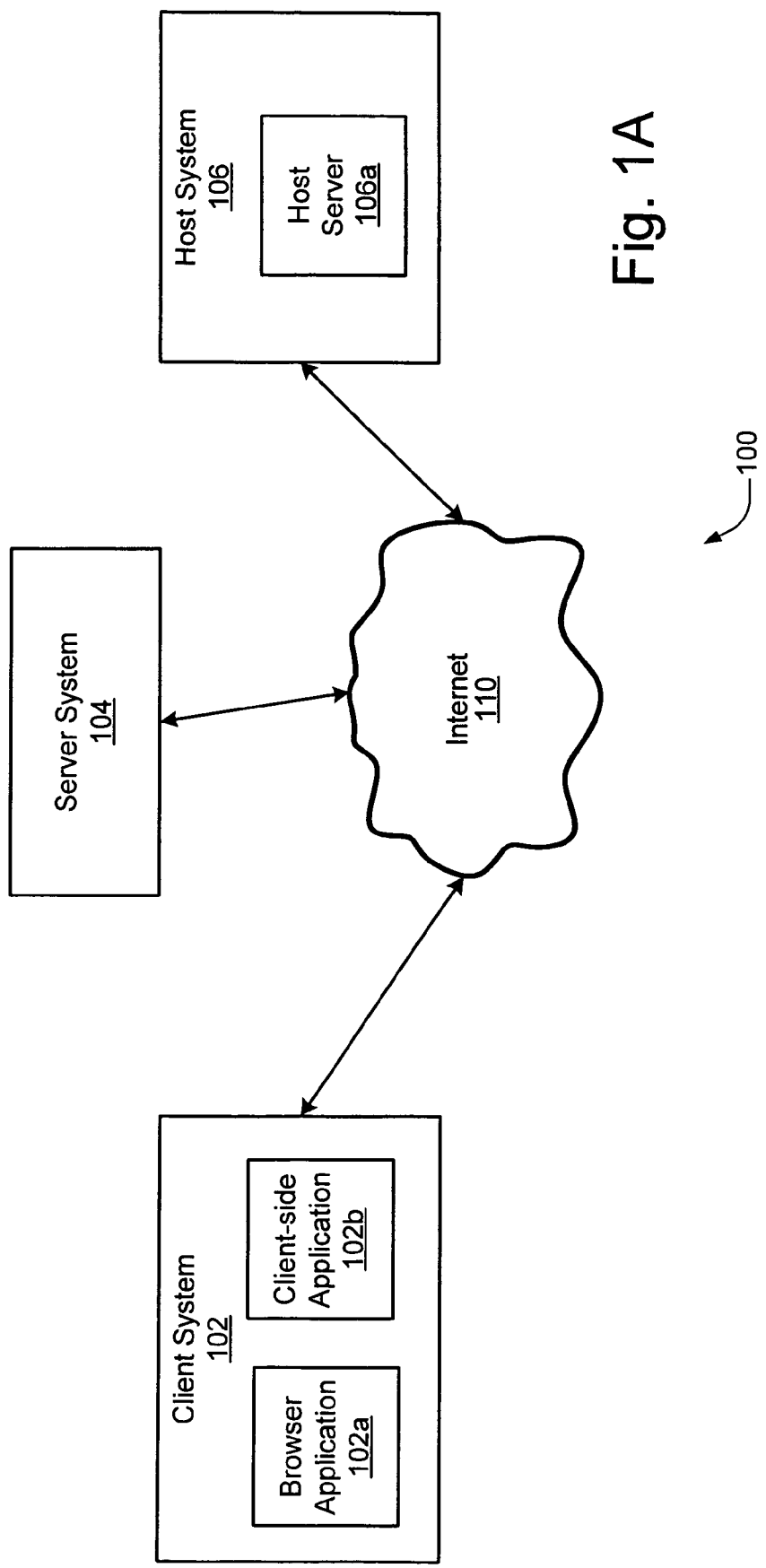

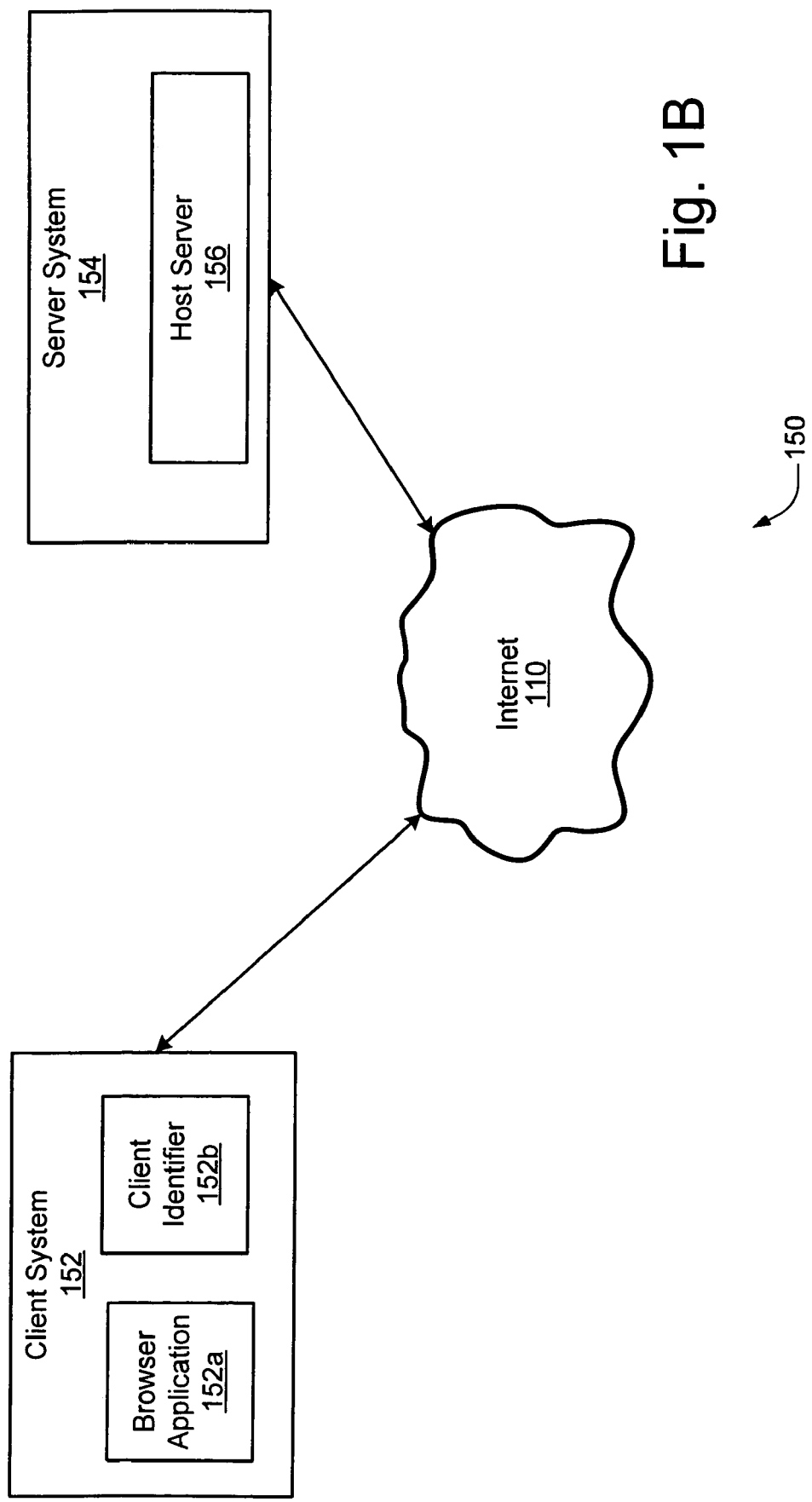

| User ID 702 | IP address 704 | Timestamp Information 706 | Toolbar ID 708 | URL Information 710 |
|---|---|---|---|---|
| DIFF Related Information 712 | Intra Page Bookmark Info 714 | Geographical location 716 | Credit card information 718 | Purchase history information 720 |
| User Profile Info 722 | Browsing Activity Info 724 | User Preferences 726 | Other Information 728 | ... |

```xml
<?xml version="1.0" ?>
<backslash xmlns:backslash="http://slashdot.org/backslash.dtd">
 - <story>
    <title>Operation Moon Bounce</title>
    <url>http://slashdot.org/article.pl?sid=04/07/24/1843259</url>
    <time>2004-07-25 07:13:00</time>
    <author>michael</author>
    <department>boing</department>
    <topic>215</topic>
    <comments>0</comments>
    <section />
    <image />
  </story>
 - <story>
    <title>Ethernet at 10 Gbps</title>
    <url>http://slashdot.org/article.pl?sid=04/07/24/1830220</url>
    <time>2004-07-25 05:00:00</time>
    <author>michael</author>
    <department>no-waiting</department>
    <topic>95</topic>
    <comments>230</comments>
    <section />
    <image />
  </story>
 - <story>
    <title>Star Wars Episode III: Revenge of the Sith</title>
    <url>http://slashdot.org/article.pl?sid=04/07/24/2231204</url>
    <time>2004-07-24 23:45:00</time>
    <author>michael</author>
    <department>become-one-with-the-suck</department>
    <topic>101</topic>
    <comments>362</comments>
    <section />
    <image />
  </story>
```

Fig. 9

TECHNIQUE FOR MODIFYING PRESENTATION OF INFORMATION DISPLAYED TO END USERS OF A COMPUTER SYSTEM

RELATED APPLICATION DATA

The present application claims priority under 35 U.S.C. §119 to U.S. Provisional Application Ser. No. 60/646,753, naming Bryar et al. as inventors, and filed Jan. 24, 2005, the entirety of which is incorporated herein by reference in its entirety for all purposes.

BACKGROUND OF THE INVENTION

1. Field of the Invention

The present invention relates generally to computer networks, and more particularly to a technique for modifying display information of web pages displayed to end users of a computer system.

2. Description of the Related Art

The Internet has recently become a popular information resource for even the most unsophisticated computer user. The popularity of the Internet as an information source is due, in part, to the vast amount of available information that can be downloaded by almost anyone having access to a computer and a network connection. The Internet's strength also lies in its open-ended nature. These and other factors have contributed to an exponential increase in Internet usage and with it, an exponential increase in the volume of available information. For example, businesses, companies, and individuals collectively publish enormous amounts of information on the Internet. As a result, a variety of informational web sites are accessible to computer users surfing the Internet. One such type of web site is referred to as a web log ("weblog"), or simply a blog.

A blog is typically implemented as a website which includes periodic, reverse chronologically ordered posts on a common webpage. Such web sites are typically accessible to any Internet user. Individual posts (which collectively form the blog or weblog) either share a particular theme, or a single or small group of authors. The totality of weblogs or blog-related webs is typically referred to as the blogosphere. The format of weblogs may vary, for example, from simple bullet lists of hyperlinks, to article summaries with user-provided comments and ratings. It is common for individual weblog entries to be dated and time-stamped.

Quite typically, weblog pages and/or other types of informational web pages include more information than can be presented to the end-user on a single display screen. As a result, the end-user is often required to scroll up/down the web page in order to view all of the information included in that web page. For example, a blog web page may include 15 separate entries, of which at most five entries may be viewable on the end-user's display screen at any one time. In order to view of the entire contents of the web page, the user may start viewing blog entries at the top of the web page and then scroll down to read the additional blog entries.

Issues may arise, however, when the user terminates the current Internet browsing session, and subsequently views the same the web page during a subsequent Internet browsing session. For example, according to conventional techniques, if the user desires to access the same web page in a subsequent Internet browsing session, the user may bookmark the web page by locally storing the URL associated with that web page. When the user later desires to access the same web page, the user may utilize the bookmark to cause the Internet browser application to retrieve the web page associated with the locally stored URL. However, conventional bookmarking techniques do not provide the user with the ability to choose where to bookmark the location or position of the web page which was last viewed by the user. Thus, when the desired web page is retrieved in a subsequent Internet browsing session, the retrieved web page will typically be displayed to the user starting at the top portion of the web page. This may be undesirable to the user since it requires the user to manually determine and locate the last viewed location/position of the web page. Additionally, conventional browser and bookmarking mechanisms do not include functionality for displaying to the user newly implemented changes and/or modifications to the web page since it was last viewed by the user. Thus, the user may also be burdened with the additional task of manually determining the presence and/or location of such changes and/or modifications in the retrieved web page. Further, conventional browser mechanisms do not provide the user with the ability to track changes in web page paginations.

Accordingly, it will be appreciated that there exists a continual need to improve upon Internet browsing techniques in order to enhance the end-user's browsing experience.

SUMMARY OF THE INVENTION

Various aspects of the present invention are directed to methods, systems, and computer program products for facilitating a display of markup document content retrieved from a host server on a computer network including a client system and a server system. An action is detected at the client system. The action may be initiated by a user of the client system, and may include a request to retrieve content relating to a first markup document associated with a first URL. Information relating to a first portion of content associated with the first markup document is retrieved, wherein at least a portion of the first portion of content was previously displayed to the user. A second portion of content associated with the first markup document may also be retrieved, wherein the second portion of content corresponds to a current version of the markup document content. The first portion of content is compared with the second portion of content to identify a third portion of content associated with the first markup document which has not previously been displayed to the user. The display of markup document content associated with the first markup document is then modified in a manner which facilitates the user in identifying the third portion of content. According to a specific embodiment, the first markup document corresponds to a weblog page, the first portion of content includes information relating to weblog page content which had been previously displayed to the user, the second portion of content includes information relating to a current version of the weblog page content, and the third portion of content includes information relating to new or modified weblog page content which was not previously displayed to the user. In at least one implementation, a portion of weblog page content to be displayed to the user may be highlighted, wherein the highlighted portion corresponds to a portion of the markup document content which was last displayed to the user a last time that the user viewed the weblog page. The weblog page may be initially displayed to the user starting from a location corresponding to the highlighted portion of content.

Another aspect of the present invention is directed to a technique for modifying a display of markup document content retrieved from a host server on a computer network which includes a client system and a server system. A first portion of content relating to a first markup document may be displayed to a user of the client system, wherein the first markup document has a URL associated therewith. Information relating to the first portion of content is stored at a desired location. A request to display a current version of the first markup document on the client system is received. A current version of content for the first markup document is retrieved from the host server. The stored information relating to the first portion of content may be used to identify a third portion of content associated with the first markup document which has not previously been displayed to the user. The display of markup document content associated with the first markup document may then be modified in a manner which facilitates the user in identifying the third portion of content.

A further aspect of the present invention is directed to a technique for modifying a display of markup document content retrieved from a host server on a computer network which includes a client system and a server system. A first portion of content relating to a first markup document is displayed to a user of the client system, the first markup document having a URL associated therewith. Information relating to the first portion of content is stored at a desired location. A request to display a current version of the first markup document on the client system is received. A current version of content for the first markup document is retrieved from the host server. The stored information relating to the first portion of content may be used to identify a first location in the current version of content which includes information relating to the first portion of content. At least a portion of the current version of content of the first markup document which corresponds to content at the first location may be initially displayed to the user in response to the received request.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIGS. 1A-1B show block diagrams of portions of a computer networks which may be used for implementing specific embodiments of the present invention.

FIG. 7 shows an example of a user record 700 which may be used for storing personal information and/or web browsing information associated with a particular user.

FIG. 9 shows an example of weblog page related content 900 which has been formatted using a standardized RSS format.

DETAILED DESCRIPTION OF THE PREFERRED EMBODIMENTS

Figure 2:
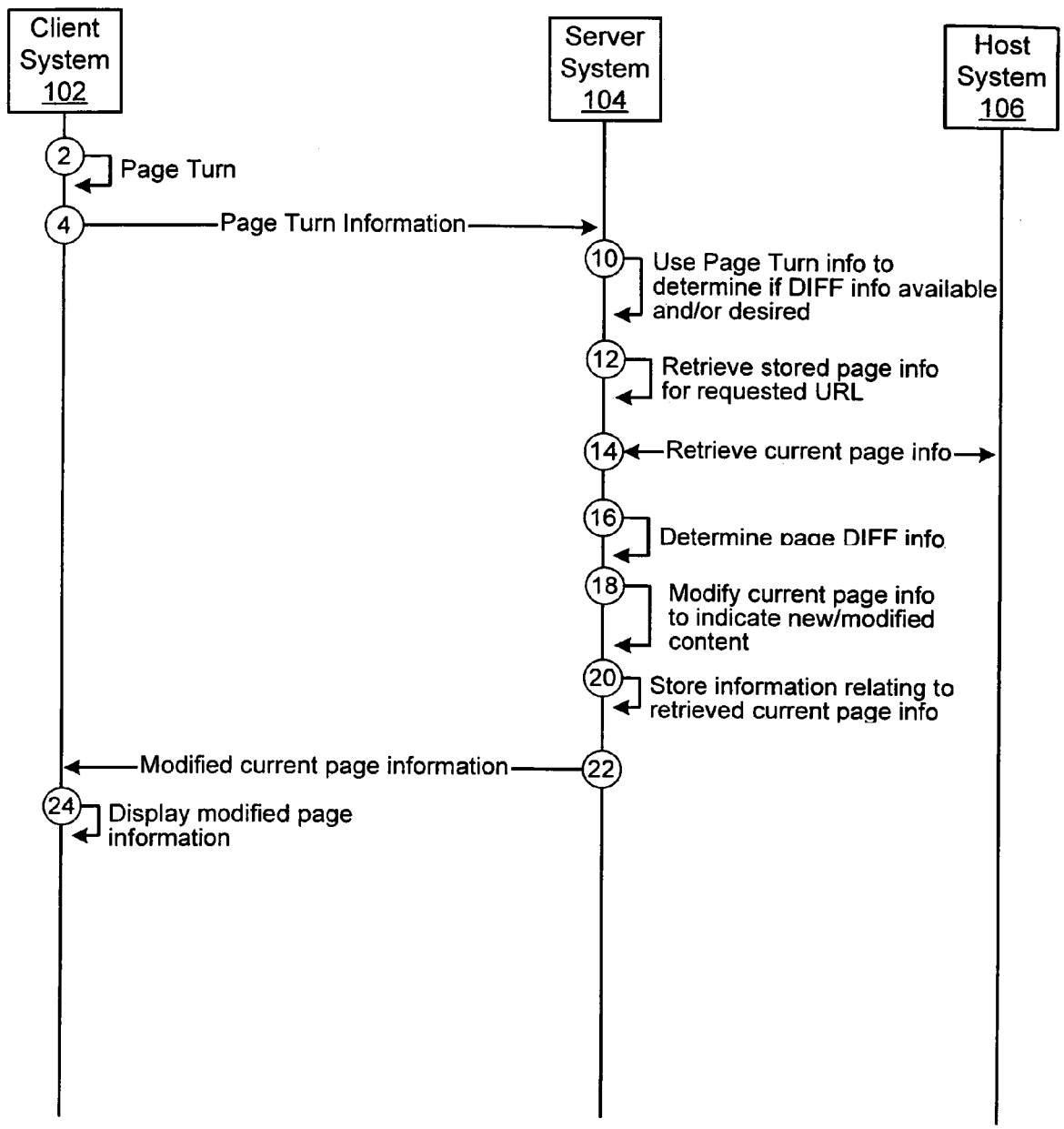
FIG. 2 shows a flow diagram illustrating a specific embodiment of various interactions which may take place between client system 102, server system 104, and host system 106 for implementing various aspects of the present invention.

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Various aspects of the present invention are directed to a variety of different techniques for enhancing a user's Internet browsing experience. FIG. 1A shows a block diagram of a portion of a computer network 100 in accordance with a specific embodiment of the present invention. As illustrated in FIG. 1A, computer network portion 100 includes at least one client system 102, at least one server system 104, and at least one host system 106. In at least one implementation, the client system 102, server system 104 and/or host system 106 may be configured or designed to communicate with each other via a wide area network such as the Internet 110. In the example of FIG. 1A, the client system 102 may correspond to an end-user computer system which, for example, may include an Internet browser application 102a and a client-side application 102b. As described in greater detail below, the client-side application 102b may be configured or designed to interface with the browser application 102a in order to perform a variety of different functions relating, for example, to Internet browsing operations, Internet searching operations, modification and/or display of web page information, etc. For example, in at least one embodiment, the client-side application 102b may be implemented as a plug-in to an Internet browser application such as, for example, Microsoft Internet Explorer or Mozilla Firefox. In one embodiment, the client-side application 102b may be implemented as a plug-in toolbar such as, for example, the A9 Toolbar available at toolbar.a9.com, which may be downloaded and installed on the user's computer system.

According to different embodiments, the client-side application 102b may be configured or designed to communicate with server system 104. In accordance with one embodiment, data associated with the web activities of a user may be transmitted by the client-side application 102b to server system 104. At least a portion of the data received at the server system 104 may be stored in a local database. U.S. Pat. No. 6,282,548, entitled "AUTOMATICALLY GENERATE AND DISPLAYING METADATA AS SUPPLEMENTAL INFORMATION CONCURRENTLY WITH THE WEB PAGE, THERE BEING NO LINK BETWEEN WEB PAGE AND METADATA," by Burner et al, incorporated herein by reference in its entirety for all purposes, discloses a toolbar capable of sending data back to a server. The data that is transmitted by the toolbar to the server may include, for example, an IP address associated with the client system, a toolbar ID which may be used for uniquely identifying the toolbar which transmitted the information, a user ID for uniquely identifying a given the user of client system 102, a URL being visited or requested by the user, timestamp information, etc. Thus, for example, a toolbar having a unique toolbar identifier may be installed on client system 102. The data that is transmitted by the toolbar to server system 104 may be transmitted on a periodic basis and/or may be transmitted upon the occurrence of specific events or actions at the client system such as, for example, a page turn or URL request, mouse/scrolling activity, keyboard activity, other user input, etc. According to at least one embodiment, the toolbar may be configured or designed to be remotely reconfigurable to enable it to change the type of information that it captures from the client. For example, in one implementation new sets of "rules" or instructions may be dynamically retrieved by the toolbar to change its behavior.

According to different embodiments of the present invention, the client-side application 102b and server system 104 may be configured or designed to track the web activity associated with the computer's IP address, toolbar ID, and/or a user's assigned user ID. While the toolbar is one way in which information associated with a user's web activity may be collected, it is noted that other mechanisms may also be used for collecting data corresponding to the user's web activities. For example, data associated with a user's web activity may be captured at the server when a user accesses web sites through the server. For example, the server and/or toolbar may be configured or designed to capture other information such as, for example, the user's browser version, the user's operating system information, cookies, etc. As described in greater detail below, a variety of user-related information may be stored at the server system such as, for example: user ID information; toolbar ID information; IP address information; timestamp information; user preference information; user web activity information; URL information; user scrolling information; information relating to the amount of time the user spends on a given web page; cursor location information; current selection information (if any); prior URL information; information relating to the method by which the user landed on the current web page (e.g.; using a bookmark, navigation, typing a URL, etc.); etc.

FIGS. 2-6 illustrate different embodiments of procedures which may be used for implementing the various aspects of the present invention. For example, FIG. 2 shows a flow diagram illustrating a specific embodiment of various interactions which may take place between client system 102, server system 104, and host system 106 for implementing various aspects of the present invention. In the example of FIG. 2, it is assumed that a user of client system 102 desires to access a web page blog located at host system 106. The blog may be retrieved, for example, by the user implementing (2) a page turn operation such as, for example, by clicking on an embedded URL link displayed in the browser application window. The page turn operation may then be detected by the client-side application 102b, and in response, the client-side application may cause specific information to be transmitted (4) to the server system 104. According to one embodiment, such information may include, for example, user ID information (if available), toolbar ID information, time stamp information, URL information, etc.

Upon receiving the page turn information, the server system 104 may use the received information to determine (10) whether any DIFF information is available and/or desired for the requested web page (e.g., blog) associated with the page turn URL information. According to at least one embodiment, the term "DIFF information" may refer to information which may be used to show or display, for example, the differences between a previous version of a document (or portion thereof) and the current version of the same document (or portion thereof). For example, the DIFF information may be used to modify the display of a web page corresponding to a requested URL. In one implementation, modification of the display of a requested web page may include displaying the web page starting at a position or location which was last viewed by the user, and/or generating a modified or marked up web page showing differences between the current version of the requested web page and a previous version of the requested web page (which, for example, may have been previously viewed by the user).

As described in greater detail below, there are a variety of different mechanisms which may be used to determine whether DIFF information is available and/or desired for a specified URL and/or user ID. For example, in one implementation, the client-side application may be configured or designed to transmit information to the server system 104 relating to web pages which have been displayed to a particular user (having an associated user ID). At least a portion of this information may be stored at the server system 104. When the user subsequently desires to view a selected web page (associated with a particular URL), the server system may check to see whether there is any locally stored information relating to the selected web page which may be used to generate DIFF information. In alternate implementations, information about previous versions of web pages may be stored, for example, at the client system 102, server system 104, and/or other locations of the Internet (e.g., Internet archive servers, RSS servers, XML servers, RDF servers, etc.). The client system 102 and/or server system 104 may be configured or designed to access such information for a selected web page/URL and compare this information to a current version of the selected web page in order to generate desired DIFF information.

For example, in one embodiment, information relating to previously displayed web page content may be stored at the client system 102, such as, for example, in a web page cache. DIFF information may then be generated at the client system, for example, by comparing the current web page content to the corresponding, cached web page content.

According to different embodiments, a variety of different algorithms may be used for generating the DIFF information. Examples of some commonly known algorithms are described in the following references: (1) Hunt, James W. and McIlroy, M. Douglas, "An Algorithm for Differential File Comparison," 41, Computing Science Technical Report, Bell Laboratories, June 1976; (2) "Comparing and Merging Files with GNU Diff and Patch", by David MacKenzie, Paul Eggert, and Richard Stallman (ISBN 0954161750) (www.gnu.org/software/diffutils/manual/); (3) E. Myers, "An O(ND) Difference Algorithm and Its Variations," Algorithmica 1, 2 (1986), 251-266 (www.cs.arizona.edu/people/gene/PAPERS/diff.ps); (4) A generic implementation of the Myers SES/LCS algorithm with the Hirschberg linear space refinement (www.ioplex.com/~miallen/libmba/dl/src/diff.c).

According to at least one embodiment of the present invention, it may not be necessary to identify the exact or complete differences between the two pages or portions of contents being compared. For example, there may be material on the pages (e.g, advertisements, sidebars, personalization) that may or will always change (and therefore can be ignored), and/or there may be slight differences in the actual content of the content which may be able to be ignored (such as, for example, a "posted 11 minutes ago" tag that will change with every viewing. In such situations, one or more "partial DIFF" techniques may be used for generating a portion or subset of DIFF information. For example, in one implementation, the structure of the document (i.e. table of contents, list of last updated posts) may be used to determine partial DIFF information. In another implementation, the internal structure (e.g., DOM or Document Object Model, which is a form of representation of structured documents as an object-oriented model) may be used to figure out the significant parts of the document and to extract the headlines, etc. that are relevant for finding differences. Similar to the DOM approach, XPaths (XML Path Language, which is a terse (non-XML) syntax for addressing portions of an XML document) may be used, especially if there is an RSS feed for the site available. In addition, traditional DIFF tools may be used on a sliding window into the document (e.g., by looking at parts of documents instead of the document as a whole) to identify where the documents align, and to thereafter identify the new content.

In an alternate embodiment, the client-side application 102b may be configured or designed to include a user selectable icon which, when selected, may cause at least a portion of a web page currently displayed on client system 102 to be stored or cached at the server system 104 and/or the client system 102. In one implementation, a "snapshot" of the currently displayed web page may be stored at the server system 104. Alternatively, selected baseline information relating to a portion of a selected web page may be stored at server system 104. Examples of such selected baseline information may include: keywords relating to the currently displayed web page; selected text from the currently displayed web page (e.g., selected sentences of each paragraph, selected paragraphs, selected date information, etc.); header information relating to the currently displayed web page; document object information relating to the currently displayed web page; hashed information relating to the currently displayed web page; and/or other information which may be used to detect subsequent changes/modifications to the currently displayed or selected web page.

According to different embodiments of the present invention, other types of information may also be collected and used to modify the display of a web page corresponding to a requested URL. In one implementation, user input activity affecting the display of web page information (e.g., scrolling activity, mouse activity, keyboard activity, etc.) may be collected and stored at client system 102 and/or server system 104. Such information may be used, for example, to determine a "last viewed" location or position of a selected web page which was previously displayed to the user. When the selected web page is subsequently retrieved at the user's request, the "last viewed" location information may be retrieved and used to display the requested web page to the user, starting at the position/location of the web page which was last viewed or displayed to the user. In alternate embodiment of the present invention, the user's "last viewed" position of a selected web page may also be determined using at least a portion of the stored baseline information relating to the selected web page.

In at least one embodiment of the present invention, the determination of the availability of DIFF information for a selected URL and/or User ID may be based, at least in part, upon the availability of current content information relating to the selected URL. For example, a variety of weblogs currently available on the Internet provide their weblog content in a format which allows the weblog content to be quickly assessed for new and/or modified content. Examples of such format types include plain text; structured text, including XML; XML standardized syndication formats such as RSS or RDF, ATOM, etc.

One such format type, commonly referred to as Really Simple Syndication (RSS), is a lightweight XML format designed for sharing headlines and other web content. Currently, many weblog content providers make their content available in RSS format as well as HTML format. An example of RSS formatted content is illustrated in FIG. 9 of the drawings, and described in greater detail below. By accessing the RSS formatted content associated with a given URL, an RSS-aware program or device can check the RSS feed for changes in the URL's content, and react to the changes in an appropriate way.

In a specific implementation, a host server may be configured to provide standardized syndication formatted content, and may also be configured to keep track of content which it has provided to different users and/or client systems. In such an implementation, the host server may be configured to generate at least a portion of DIFF information relating to requested web page content. For example, a client system may request from an RSS server information relating to "new content which I have not yet received." In response, the RSS server may provide to the client system an RSS feed which includes only the requested new content. In at least one implementation, the RSS server may identify the requesting user and/or client system using cookie information and/or other client/user identifier information. Such functionality may be implemented, for example, via the network portion 150 illustrated in FIG. 1B.

In the example of FIG. 1B, the operating system software and/or browser application software may be configured to include functionality similar to that of the above-described client side application 102b (of FIG. 1A). In this example, it is assumed that the browser application 152a has been configured to include functionality similar to that of the above-described client side application 102b. Accordingly, the client-side application may be omitted from client system 152. In the implementation of FIG. 1B, the client system 152 includes a client identifier 152b, which may be used for uniquely identifying client system 102 and/or a particular user of client system 102. According to different embodiments, the client identifier 152b may include cookie information, client system identifier information, user ID information, etc. Additionally, according to at least one embodiment, the host system and server system may be implemented at the same system. For example, as illustrated in FIG. 1B, server system 154 includes host server 156. In at least one implementation, the host server may be configured to recognize the user ID and to look up information relating to the user's last visit in a database. For example, when a user visits the host web site, the host server may be configured to remember at least a portion of the information which was previously presented to the user, and return a page which may include text and/or formatting for indicating new web page content which has not yet been displayed or presented to the user.

In at least one embodiment of the present invention, the determination of the desirability of providing DIFF information for a selected URL and/or user ID may be based, at least in part, upon the availability of user preference information, user browsing information, and/or other information which may be used to determine the desirability of providing DIFF information for a selected URL and/or user ID. For example, a user may specify his or her preference for displaying all or selected URLs with modified information/formatting using available DIFF information. Alternatively, the client-side application 102b and/or the server system 104 may be configured or designed to automatically determine the selection of URLs which are to be displayed with modified information/formatting using available DIFF information. Such determinations may be based upon a variety of factors such as, for example, the Internet browsing activities of one or more users, the relative popularity of specific URLs, user profile information, predetermined selection rules, website content, etc.

In the example of FIG. 2, it is assumed that DIFF information is available for the requested URL, and that it is desirable to use the DIFF information to modify the display of the web page corresponding to the requested URL. Additionally, in this example, it is assumed that the server system 104 has stored information relating to content of the requested web page which has been previously displayed to the user. Accordingly, as shown at (12), the server system 104 retrieves the stored information relating to content of the requested URL which has been previously displayed to the user. Additionally, the server system may also use the URL information (from the received page turn information) to retrieve (14) information relating to the current version of the web page content corresponding to the requested URL. Such information may include, for example, HTML content, RSS (or other syndication) formatted content, and/or other information which may be used to generate DIFF information for the web page corresponding to the requested URL. Additionally, The server system 104 may then compare the current web page information with the stored (or cached) web page information in order to determine and/or generate (16) DIFF information relating to the requested web page. According to at least one embodiment, the DIFF information may include information relating to content of the requested web page which has been added and/or modified since the last time the web page was displayed to the user.

It will be appreciated that there are a variety of different techniques which may be used for detecting and/or tracking changes or modifications of web page content. For example, in specific embodiments where the server system data storage includes information relating to web page content that has been previously displayed to the user, a comparison of the previously displayed web page content information with current web page content information may reveal changes or modifications of the web page content. In alternate embodiments where RSS information is available for the requested web page, information obtained from the RSS feed (such as, for example, timestamp information, title or headline information, etc.) may be compared to previously stored web page content information in order to determine, for example, the presence of additional and/or modified content for the requested web page. Other techniques which may be used for detecting and/or tracking changes or modifications of web page content are described, for example, in U.S. Pat. No. 6,596,030, entitled "IDENTIFYING CHANGES IN ON-LINE DATA REPOSITORIES"; U.S. Patent Application Publication No. 20030009563, entitled "METHOD FOR CLIENT-SIDE INCLUSION OF DATA ELEMENTS"; U.S. Patent Application Publication No. 20020120648, entitled "IDENTIFYING CHANGES IN ON-LINE DATA REPOSITORIES"; U.S. Pat. No. 6,366,933, entitled "METHOD AND APPARATUS FOR TRACKING AND VIEWING CHANGES ON THE WEB"; U.S. Pat. No. 6,249,795, entitled "PERSONALIZING THE DISPLAY OF CHANGES TO RECORDS IN AN ON-LINE REPOSITORY"; and U.S. Pat. No. 5,860,071, entitled "QUERYING AND NAVIGATING CHANGES IN WEB REPOSITORIES"; each of which is incorporated herein by reference in its entirety for all purposes.

Once the appropriate DIFF information has been determined and/or generated, the content of the retrieved web page may be modified (18) in a manner to indicate new and/or modified content. Such modifications may help facilitate the user determining which portions of the web page have been added and/or modified since the user last viewed that web page. In at least one embodiment, the content of the web page may be automatically and dynamically modified, marked up and/or altered by the server system 104. For example, in one implementation, new web page content which has not been displayed to the user previously may be highlighted and/or place at the top of the web page. Additionally, at least one pointer may be generated for indicating the last position of the web page which was previously displayed to the user. Web page content which has been previously viewed by the user may be modified in a manner to indicate to the user that such content has already been displayed to the user (e.g., by reducing the font size of the text, by shading selected portions of the content in a different color, etc.).

After the retrieved web page content has been appropriately modified, information relating to the current content of the web page may be stored (20) at server system 104. In alternate embodiments, at least a portion of the information relating to the retrieved, current web page content may be stored at client system 102 and/or stored at other locations within the computer network. In at least one implementation, the stored information relating to the current content of the web page may be used at a later time to help determine and/or generate new DIFF information when the user subsequently requests to view the web page again. According to different implementations, the stored information relating to the current content of the web page may include, for example, selected portions of web page content, web page fingerprint information (e.g., hash of selected portions of web page content), web page digest information, web page syndication information (e.g., RSS information), etc. In at least one embodiment, other information which may be useful for determining changes to web pages or other type of documents may be stored at server system, at client system and/or stored at other locations within the computer network.

As shown at (22), the modified content of the requested web page may then be sent to the client system 102 and displayed (24) to the user. According to one embodiment, the modified content may be displayed to the user in a format which indicates to the user the portions of the web page which are new/modified since the user last viewed the web page. Additionally, the web page may be displayed to the user starting at a particular location such as, for example, the position of the web page which was last viewed by the user. Alternatively, specific portions of the web page may be highlighted to indicate the portion of the web page which was last viewed or displayed to the user. In one implementation, the modified web page content may be displayed on the client system 102 using the browser application 102a. In an alternate embodiment, the client-side application 102b may be configured or designed to facilitate the display of at least a portion of the modified web page content.

The example of FIG. 2 illustrates a specific embodiment of the present invention in which the server system 104 performs the operations of retrieving the requested web page from the host system 106, and modifying the retrieved web page information in a manner to indicate new and/or modified content. Such an embodiment may be useful, for example, in situations where it is desirable to reduce or minimize the processing operations required to be performed at the client system 102.

Figure 3:
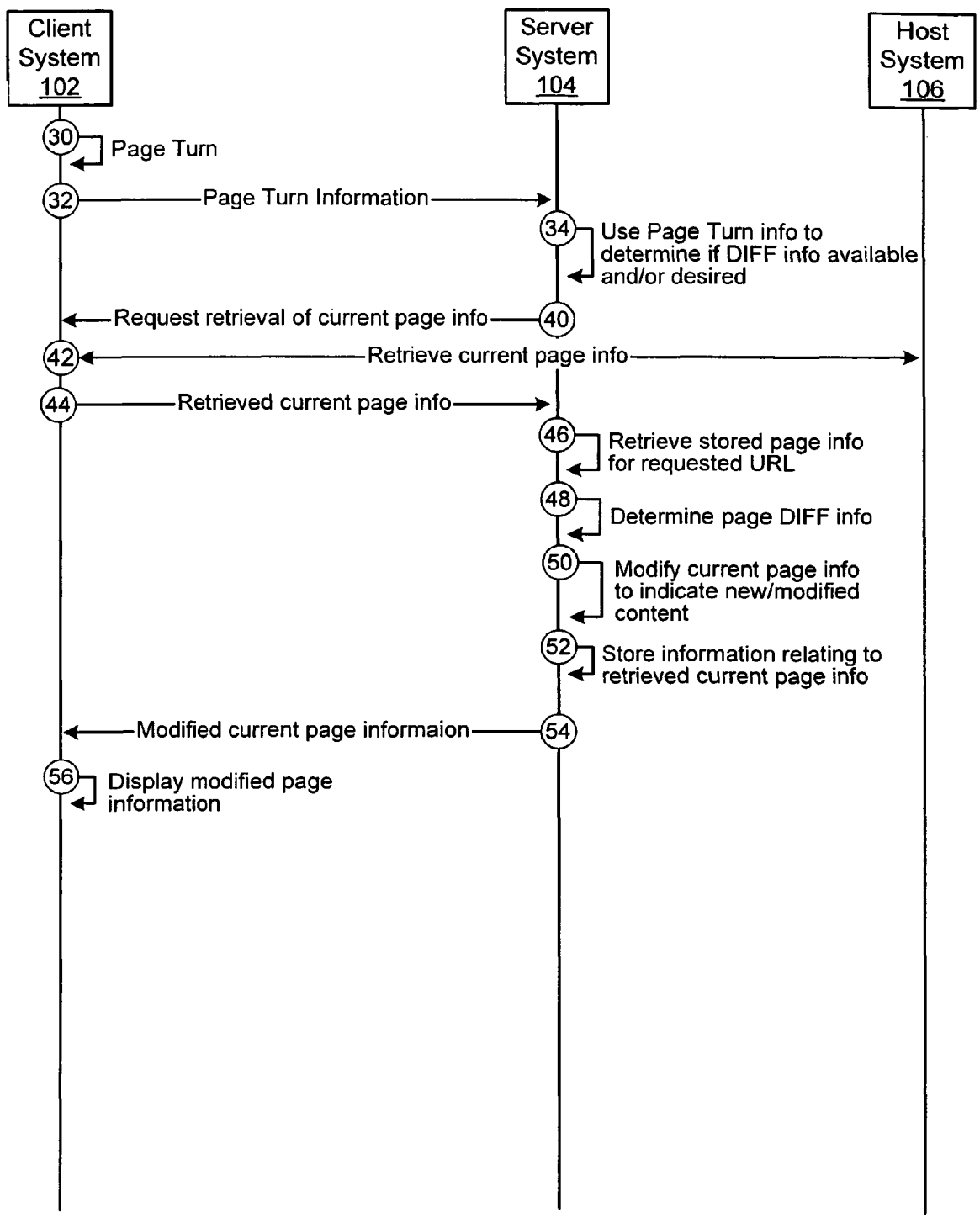
FIG. 3 shows a flow diagram of an alternate embodiment of the present invention in which the client system 102 performs an operation of retrieving the requested web page from the host system 106.

FIG. 3 shows a flow diagram of an alternate embodiment of the present invention in which the client system 102 performs the operation of retrieving the requested web page from the host system 106. As described in greater detail below, the embodiment illustrated in the example of FIG. 3 may be advantageous, for example, in situations where the content of the requested web page includes information which may change and/or be restricted (e.g., customized, personalized and/or password protected information), depending upon the source that is requesting the information.

In the example of FIG. 3, it is assumed that a user of client system 102 desires to access a web page blog located at host system 106. The blog may be retrieved, for example, by the user implementing (30) a page turn operation such as, for example, by clicking on an embedded URL link displayed in the browser application window. The page turn operation may then be detected by the client-side application 102b, and in response, the client-side application may cause specific information to be transmitted (32) to the server system 104. According to one embodiment, such information may include, for example, user ID information (if available), toolbar ID information, time stamp information, URL information, etc.

Upon receiving the page turn information, the server system 104 may use the received information to determine (34) whether any DIFF information is available and/or desired for the requested web page (e.g., blog) associated with the page turn URL information. A detailed explanation regarding the availability and/or desirability of DIFF information for a specific web page, URL, and/or user ID has been described previously, for example, with respect to FIG. 2 of the drawings.

In the example of FIG. 3, it is assumed that DIFF information is available for the requested URL, and that it is desirable to use the DIFF information to modify the display of the web page corresponding to the requested URL. Additionally, in this example, it is assumed that the server system 104 has stored information relating to content of the requested web page which has been previously displayed to the user. Accordingly, as shown at (40), the server system 104 may request the client system 102 to retrieve the web page corresponding to the requested URL. One advantage of utilizing client system 102 to retrieve the requested web page content is that such a technique helps to ensure that the correct web page content is retrieved from the host system 106. For example, in at least one embodiment, at least a portion of the web pages available at host system 106 may include customized information which may change and/or be restricted depending upon the source that is requesting the information. In such a situation, the web page content retrieved by server system 104 for a selected URL may differ from the web page content retrieved by client system 102 for the same URL. Accordingly, in such situations, it may be desirable to utilize the client system 102 for retrieving the web page content from host system 106. In response, the client system 102 may retrieve (42) the content of the requested web page from host system 106, and transmit (44) the retrieved content to server system 104 for further processing.

As shown at (46), the server system 104 may retrieve the stored information relating to content of the requested URL which has been previously displayed to the user. Additionally, the server system may also use the URL information (from the received page turn information) to retrieve other information relating to the current version of the web page corresponding to the requested URL. Such information include, for example, HTML content, RSS (or other syndication) formatted content, and/or other information which may be used to generate DIFF information for the web page corresponding to the requested URL. The server system 104 may then compare the current web page information with the stored (or cached) web page information in order to determine and/or generate (48) DIFF information relating to the requested web page. According to at least one embodiment, the DIFF information may include information relating to content of the requested web page which has been added and/or modified since the last time the web page was displayed to the user.

Once the appropriate DIFF information has been determined and/or generated, the content of the retrieved web page may be modified (50) by server system 104 in a manner to indicate new and/or modified content. Such modifications may help assist the user in determining which portions of the web page have been added and/or modified since the user last viewed that web page. In at least one embodiment, the content of the web page may be automatically and dynamically modified, marked up and/or altered by the server system 104. For example, in one implementation, new web page content which has not been displayed to the user previously may be highlighted and/or place at the top of the web page. Additionally, at least one pointer may be generated for indicating the last position of the web page which was previously displayed to the user. Web page content which has been previously viewed by the user may be modified in a manner to indicate to the user that such content has already been displayed to the user (e.g., by reducing the font size of the text, by shading selected portions of the content in a different color, etc.).

After the retrieved web page content has been appropriately modified, information relating to the current content of the web page may be stored (52) at server system 104. In alternate embodiments, at least a portion of the information relating to the retrieved, current web page content may be stored at client system 102 and/or stored at other locations within the computer network. In at least one implementation, the stored information relating to the current content of the web page may be used at a later time to help determine and/or generate new DIFF information when the user subsequently requests to view the web page again. According to different implementations, the stored information relating to the current content of the web page may include, for example, selected portions of web page content, web page fingerprint information (e.g., hash of selected portions of web page content), web page digest information, web page syndication information (e.g., RSS information), etc.

As shown at (54), the modified content of the requested web page may then be sent to the client system 102 and displayed (56) to the user. According to one embodiment, the modified content may be displayed to the user in a format which indicates to the user the portions of the web page which are new/modified since the user last viewed the web page. Additionally, the web page may be displayed to the user starting at a particular location such as, for example, the position of the web page which was last viewed by the user. Alternatively, specific portions of the web page may be highlighted to indicate the portion of the web page which was last viewed or displayed to the user. In one implementation, the modified web page content may be displayed on the client system 102 using the browser application 102a. In an alternate embodiment, the client-side application 102b may be configured or designed to facilitate the display of at least a portion of the modified web page content.

The example of FIG. 3 illustrates a specific embodiment of the present invention in which the client system 102 performs the operation of retrieving the requested web page from the host system 106, and in which the server system 104 performs the operation of modifying the retrieved web page information in a manner to indicate new and/or modified content.

Figure 4:
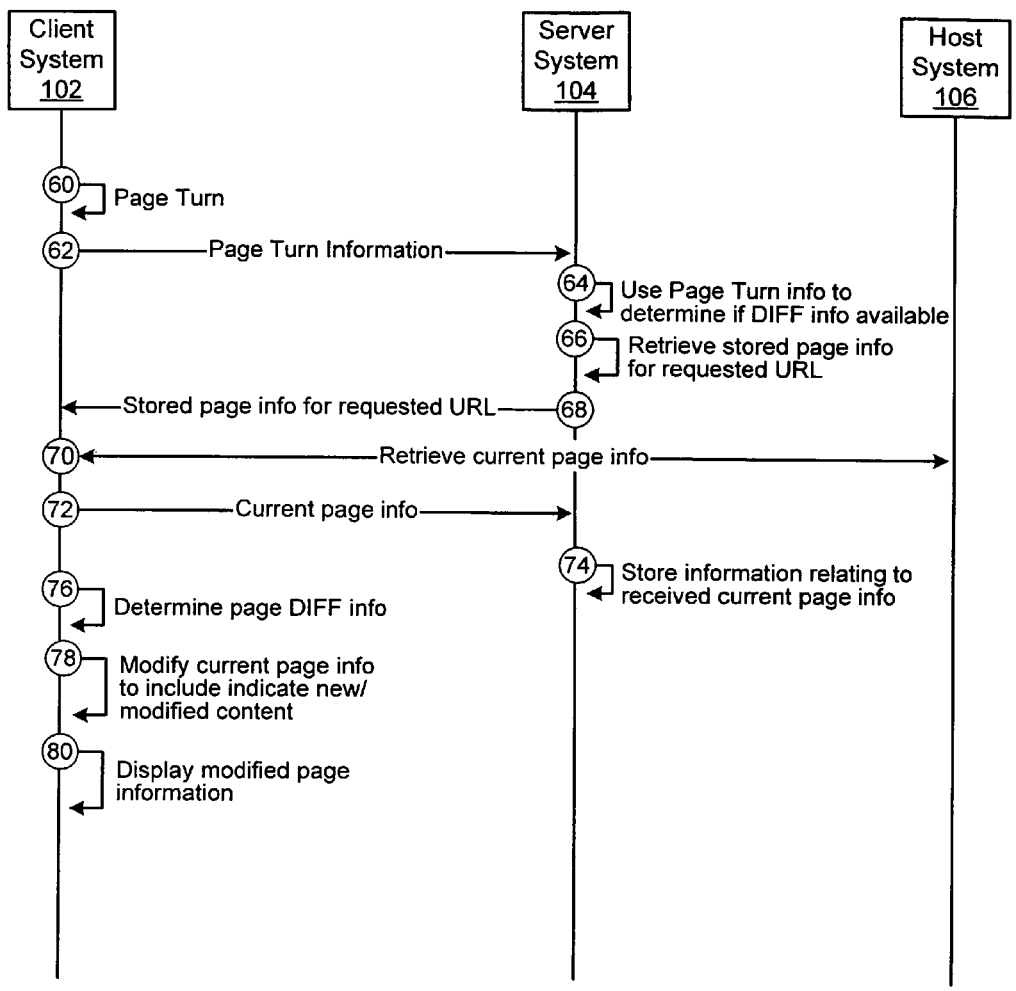
FIG. 4 shows a flow diagram of an alternate embodiment of the present invention in which the client system 102 performs the operations of retrieving the requested web page from the host system 106 and modifying the retrieved web page information in a manner to indicate new and/or modified content.

FIG. 4 shows a flow diagram of an alternate embodiment of the present invention in which the client system 102 performs the operation of retrieving the requested web page from the host system 106, and also performs the operation of modifying the retrieved web page information in a manner to indicate new and/or modified content. As described in greater detail below, the embodiment illustrated in the example of FIG. 4 may be advantageous, for example, in situations where the content of the requested web page customized includes information which may change and/or be restricted depending upon the source that is requesting the information, and/or in situations where it is desirable to minimize or reduce the processing operations performed at server system 104.

In the example of FIG. 4, it is assumed that a user of client system 102 desires to access a web page blog located at host system 106. The blog may be retrieved, for example, by the user implementing (60) a page turn operation such as, for example, by clicking on an embedded URL link displayed in the browser application window. The page turn operation may then be detected by the client-side application 102b, and in response, the client-side application may cause specific information to be transmitted (62) to the server system 104. According to one embodiment, such information may include, for example, user ID information (if available), toolbar ID information, time stamp information, URL information, etc.

Upon receiving the page turn information, the server system 104 may use the received information to determine (64) whether any DIFF information is available and/or desired for the requested web page (e.g., blog) associated with the page turn URL information. A detailed explanation regarding the availability and/or desirability of DIFF information for a specific web page, URL, and/or user ID has been described previously, for example, with respect to FIG. 2 of the drawings.

In the example of FIG. 4, it is assumed that DIFF information is available for the requested URL, and that it is desirable to use the DIFF information to modify the display of the web page corresponding to the requested URL. Additionally, in this example, it is assumed that the server system 104 has stored information relating to content of the requested web page which has been previously displayed to the user. Accordingly, as shown at (66), the server system 104 retrieves the stored information relating to content of the requested URL which has been previously displayed to the user, and transmits (68) at least a portion of this information to client system 102.

As shown at (70), the client system 102 retrieves information relating to the current version of the requested web page content from host system 106. Such information may include, for example, HTML content, XML formatted content, RSS (or other syndication) formatted content, and/or other information. The client system 102 may transmit (72) at least a portion of the retrieved web page content information to the server system 104. The server system 104 may store (74) at least a portion of this information for subsequent use. In at least one implementation, the stored information relating to the current content of the web page may be used at a later time to help determine and/or generate new DIFF information when the user subsequently requests to view the web page again. According to different implementations, the stored information relating to the current content of the web page may include, for example, selected portions of web page content, web page fingerprint information (e.g., hash of selected portions of web page content), web page digest information, web page syndication information (e.g., RSS information), etc.

As shown at (76), the client system 102 may compare the current web page information with the previous web page information in order to determine and/or generate DIFF information relating to the requested web page. According to at least one embodiment, the DIFF information may include information relating to content of the requested web page which has been added and/or modified since the last time the web page was displayed to the user.

Once the appropriate DIFF information has been determined and/or generated, the content of the retrieved web page may be modified (78) by client system 102 in a manner to indicate new and/or modified content. Such modifications may help assist the user in determining which portions of the web page have been added and/or modified since the user last viewed that web page. In at least one embodiment, the content of the web page may be automatically and dynamically modified, marked up and/or altered by the server system 104. For example, in one implementation, new web page content which has not been displayed to the user previously may be highlighted and/or place at the top of the web page. Additionally, at least one pointer may be generated for indicating the last position of the web page which was previously displayed to the user. Web page content which has been previously viewed by the user may be modified in a manner to indicate to the user that such content has already been displayed to the user (e.g., by reducing the font size of the text, by shading selected portions of the content in a different color, etc.). In at least one implementation, at least a portion of the modified web page content information may be stored at server system 104 and/or client system 102.

As shown at (80), the modified content of the requested web page may then be displayed to the user. According to one embodiment, the modified content may be displayed to the user in a format which indicates to the user the portions of the web page which are new/modified since the user last viewed the web page. Additionally, the web page may be displayed to the user starting at a particular location such as, for example, the position of the web page which was last viewed by the user. Alternatively, specific portions of the web page may be highlighted to indicate the portion of the web page which was last viewed or displayed to the user. In one implementation, the modified web page content may be displayed on the client system 102 using the browser application 102a. In an alternate embodiment, the client-side application 102b may be configured or designed to facilitate the display of at least a portion of the modified web page content.

Figure 10A:
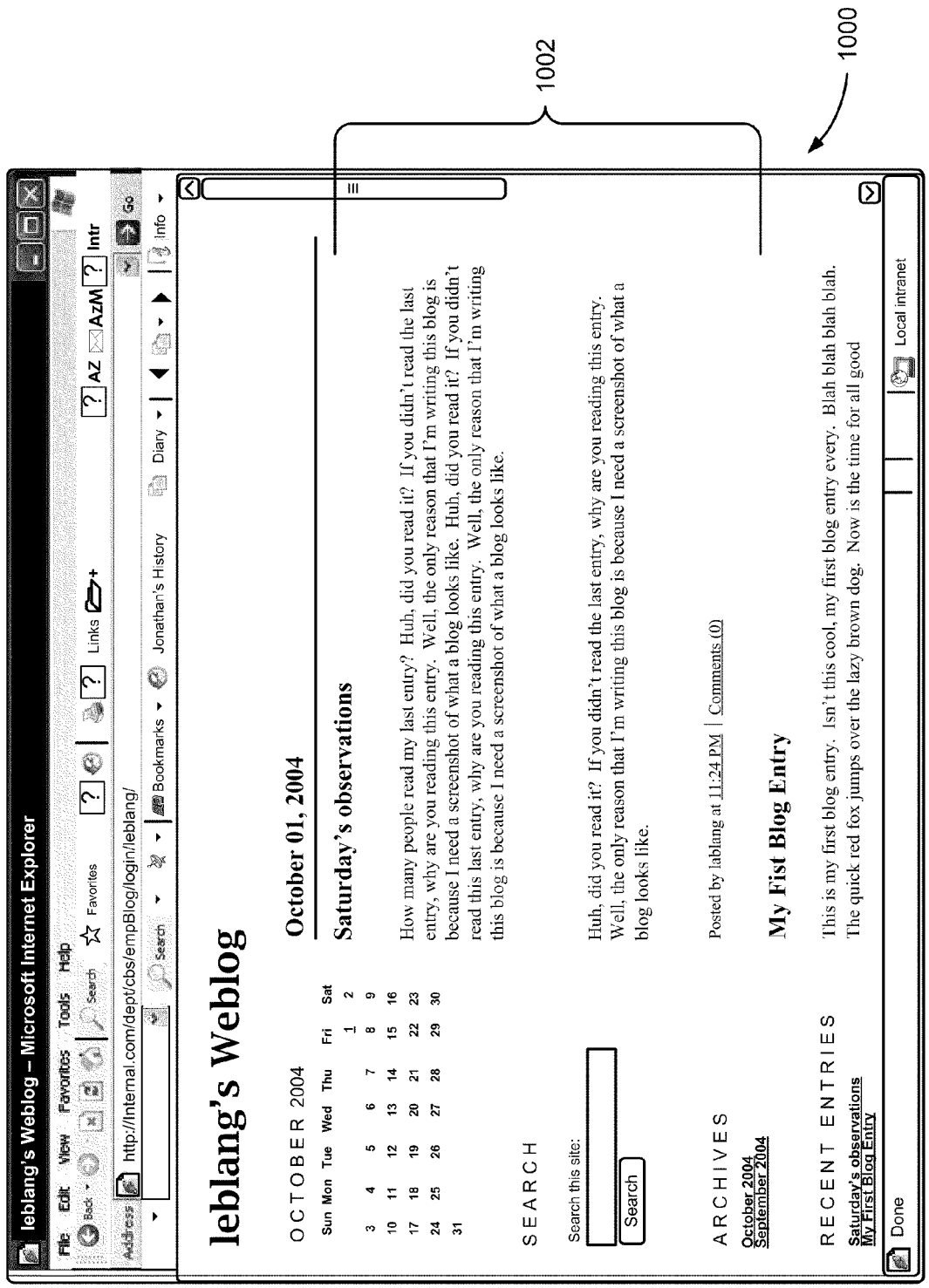
FIGS. 10A-E illustrate different examples of how a web page content may be modified and displayed in accordance with various embodiments of the present invention.

FIGS. 10A-E illustrate different examples of how a web page content may be modified and displayed to the user in a format which indicates to the user the portions of the web page which are new/modified since the user last viewed the web page. For example, referring to FIG. 10A, a portion 1000 of weblog page content may be displayed to a user (e.g., via client system 102). As shown in the example of FIG. 10A, the weblog page display includes a first weblog entry or post 1002.

Figure 10B:
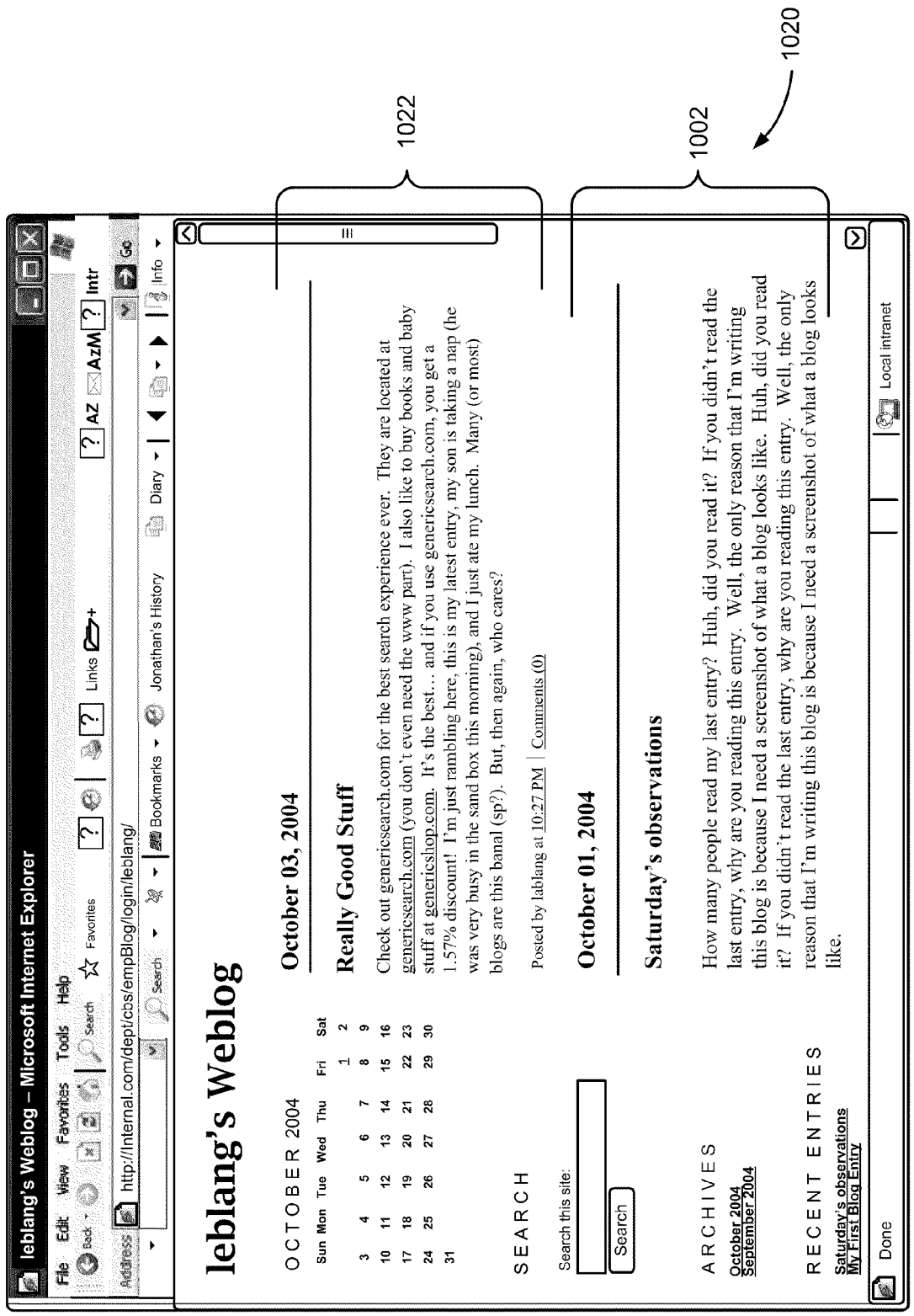
Figure 10C:
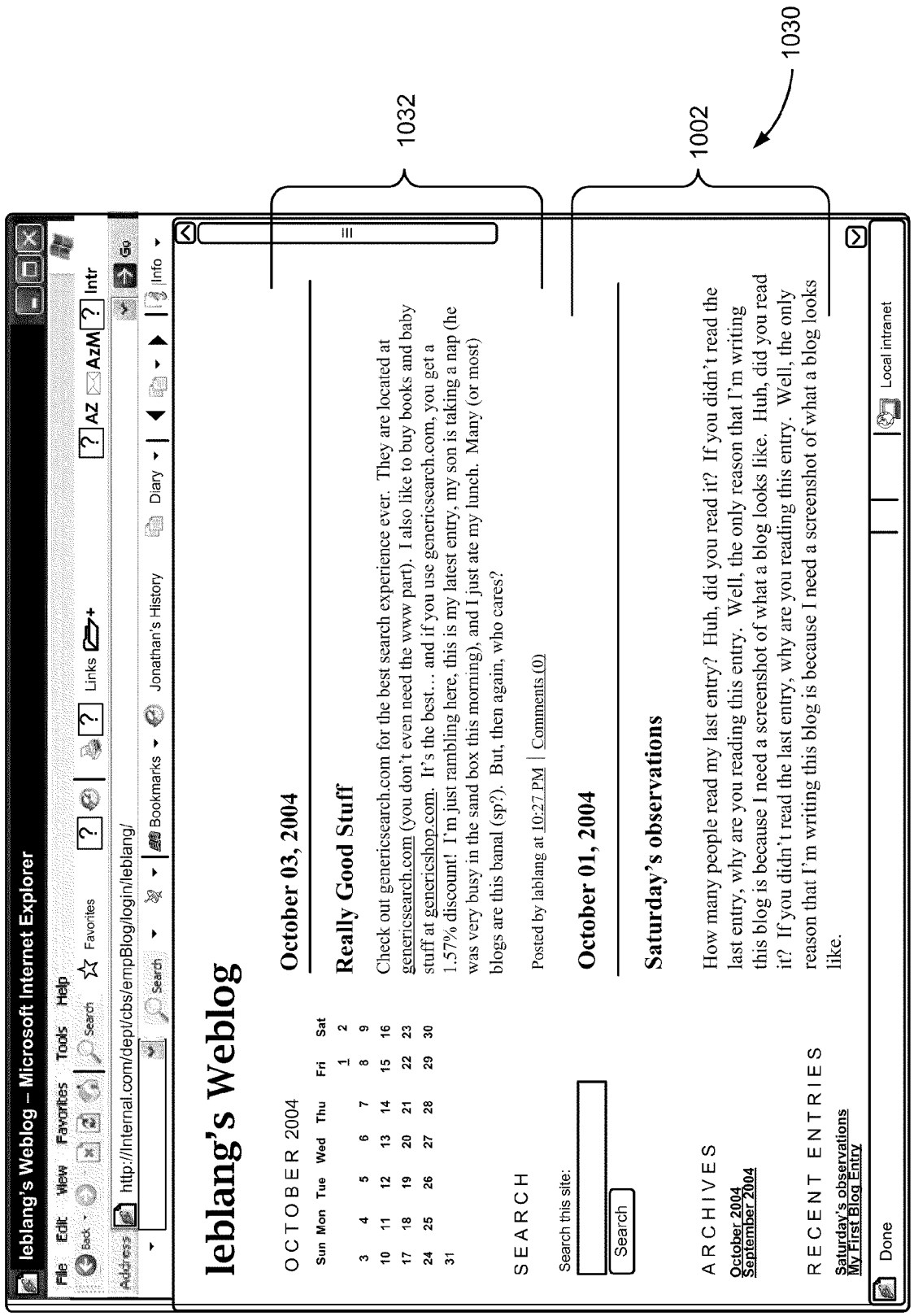
Figure 10D:
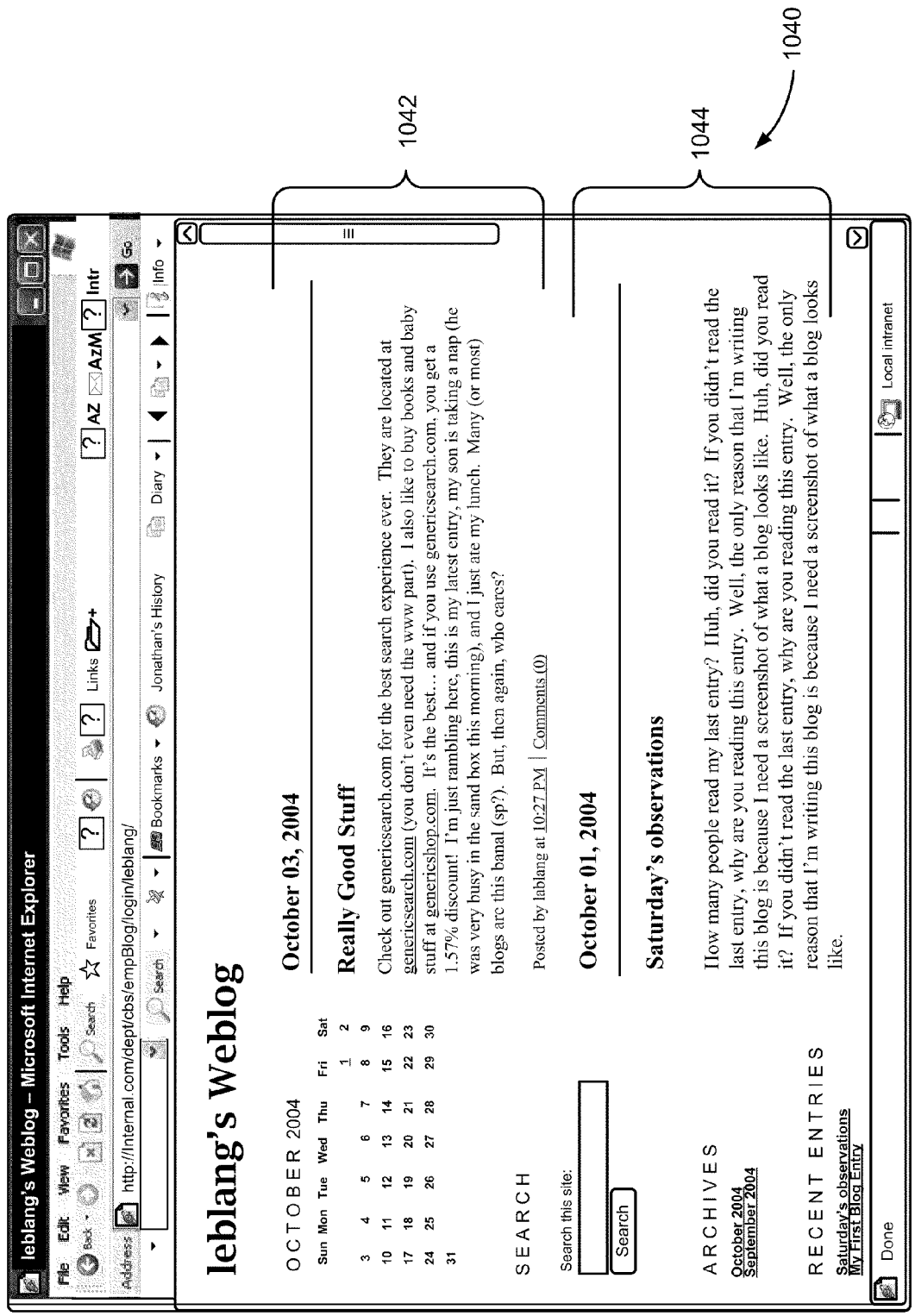
Figure 10E:
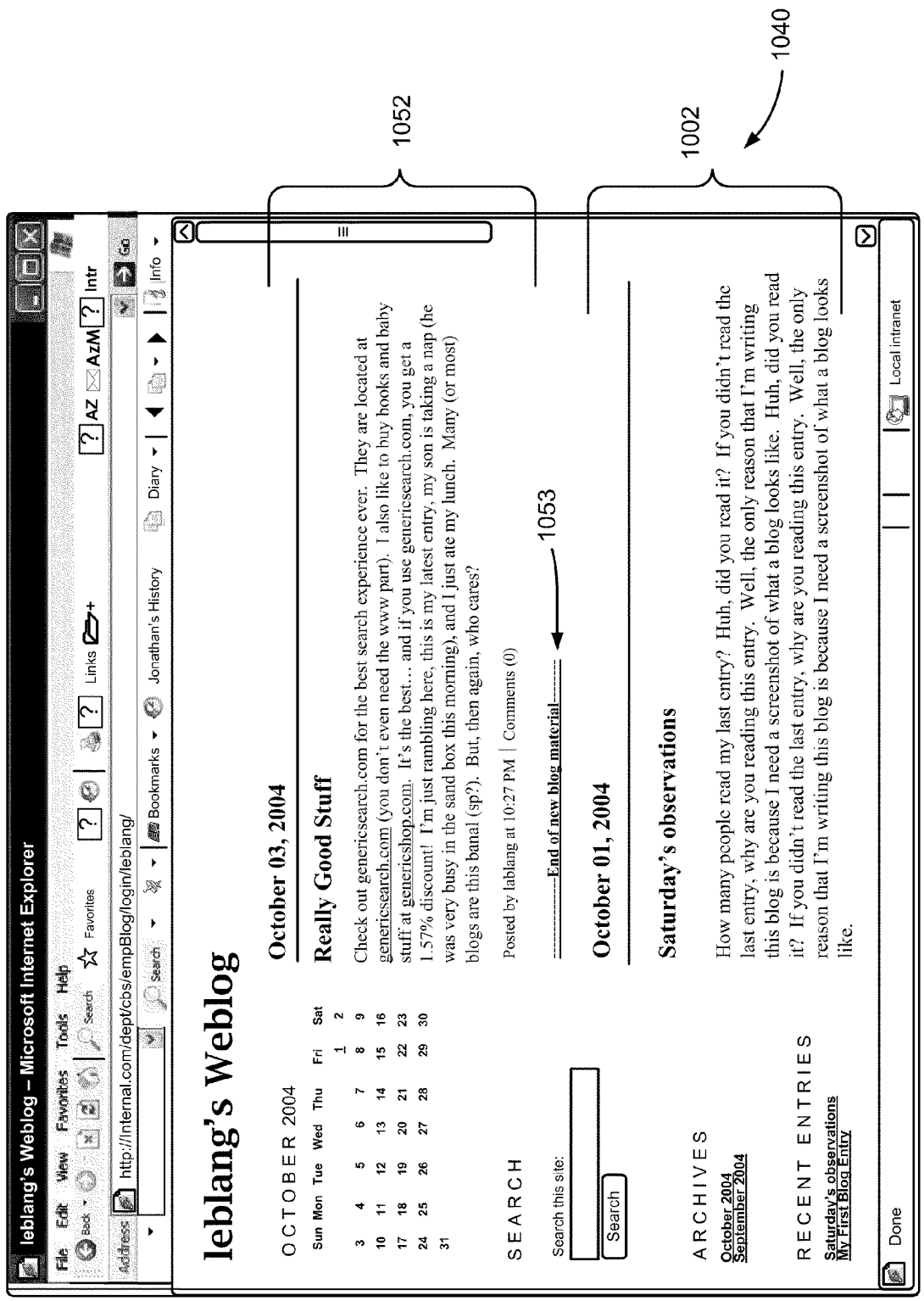

In the example of FIG. 10B, it is assumed that a subsequent (new) weblog entry or post 1022 has been added to the weblog page content. In accordance with different embodiments of the present invention, the new web page content 1022 and/or previously displayed web page content 1002 may be modified and displayed to the user in a manner which allows the user to more easily distinguish the new and/or modified web page content from the previously displayed web page content. For example, in one implementation as illustrated in FIG. 10C, the new weblog page content 1032 may be displayed using specialized formatted text such as, for example, bold, italics, underlining, highlighting, different font color, etc. in a specific example of FIG. 10C, the new weblog page content 1032 is displayed using bold text formatting, whereas the previously viewed web page content 1002 is displayed using normal text formatting. In an alternate embodiment as shown in the example of FIG. 10D, the previously viewed weblog page content 1044 is displayed using a lighter font color (e.g., grey), which allows the user to quickly determine the portion of web page content which has been previously displayed to the user. In an alternate embodiment as shown in the example of FIG. 10E, the weblog page has been modified to include additional content (e.g., additional text portion 1053) for assisting in the user in distinguishing new and/or modified web page content from the previously displayed web page content.

It will be appreciated that other embodiments of the present invention may utilize one or more of the above-described modification techniques for enabling a user to more easily distinguish new and/or modified web page content from the previously displayed web page content, as well as other types of modification techniques commonly known to one having ordinary skill in the art. Additionally, according to at least one embodiment, various characteristics of such modifications and/or display techniques (e.g., font styles, colors, backgrounds, message text, etc.) may be configured to be user selectable. In one implementation, the specific preferences selected by a particular user may be recorded, for example, in a user preference file, and stored on the client system, server system, and/or host server.

The example of FIG. 4 illustrates a specific embodiment of the present invention in which the client system 102 performs the operation of retrieving the requested web page from the host system 106, and performs the operation of modifying the retrieved web page information in a manner to indicate new and/or modified content. Such an embodiment may be useful, for example, in situations where it is desirable to reduce or minimize the processing operations and/or bandwidth requirements associated with the server system 102.

Figure 5:
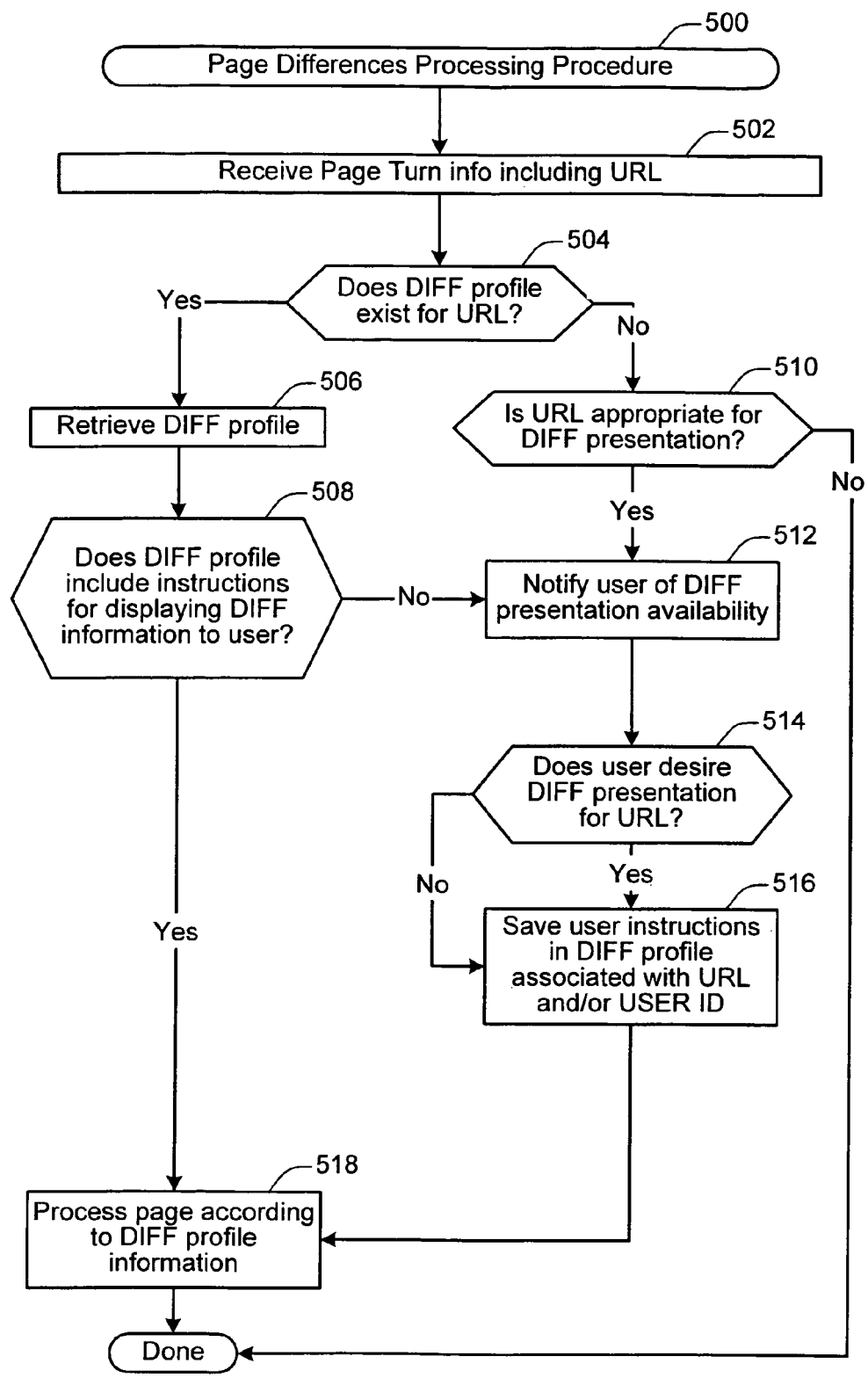
FIG. 5 shows a flow diagram of a Page Differences Processing Procedure 500 in accordance with a specific embodiment of the present invention.

FIG. 5 shows a flow diagram of a Page Differences Processing Procedure 500 in accordance with a specific embodiment of the present invention. According to at least one implementation, the Page Differences Processing Procedure 500 may be implemented at the client system 102 and/or server system 104. For example, in at least one embodiment, the Page Differences Processing Procedure 500 may be implemented as part of the process in determining the availability and/or desirability of DIFF information for a given URL and/or user ID, as described previously, for example, with respect to FIGS. 2-4 of the drawings.

In the example of FIG. 5, it is assumed that a user of client system 102 desires to access a web page for a specific URL at host system 106, and implements a page turn operation for the specified URL at client system 102. According to one implementation, the page turn operation is detected by the client-side application 102b, and in response, the client-side application causes specific information to be transmitted to the server system 104. According to one embodiment, such information may include, for example, user ID information (if available), toolbar ID information, time stamp information, URL information, etc.

Upon receiving (502) the page turn information, a determination may be made (504) as to whether there exists a DIFF profile for the URL specified in the page turn information. According to at least one implementation, the server system of 104 and/or client system 102 may include DIFF profile information associated with one or more URLs and/or user IDs. The DIFF profiles information may include a variety of information such as, for example: whether or not DIFF information is able to be generated for a particular URL; whether or not stored versions of previous web page content are available for a particular URL; whether or not web page syndication information is available for a particular URL; whether or not a particular user desires DIFF information for a particular URL to be displayed; etc. In one implementation, DIFF profile information may be indexed according to an associated URL. In an alternate implementation DIFF profile information may be indexed according to an associated user ID.

If it is determined that there does not exist DIFF profile information for the specified URL, a determination may then be made (510) as to whether the specified URL is appropriate for DIFF presentation. According to at least one embodiment, the determination as to whether or not a particular URL is appropriate for DIFF presentation may be based, at least in part, upon predetermined criteria such as, for example: whether or not information is available about prior versions of the web page content (associated with the specified URL); whether or not syndication formatted content (e.g., RSS, RDF, ATOM, etc.) is available for the specified URL; whether or not the web page content includes user-specific customized information; whether the user has visited the page before (e.g., from their browsing history); whether it can be determined how much of the page has changed (e.g., if more than a specified percentage of the content of the page has changed, such as, for example, greater than 90%); etc.

If it is determined that the specified URL is appropriate for DIFF presentation, the user may be notified (512) of the availability for DIFF information to be displayed. The user may then input (514) instructions for the user's preference regarding the display of DIFF information for the specified URL. The user instructions may be stored (516) in a DIFF profile associated with the specified URL and/or user ID. Thereafter, the web page content for the specified URL may be processed (518) and displayed according to the DIFF profile information.

Returning to 504, if it is determined that there exists DIFF profile information for the specified URL, the DIFF profile information may be retrieved (506), and a determination made (508) as to whether the DIFF profile information includes instructions for displaying DIFF information to the user. For example, in one implementation the page turn information may include user ID information relating to the identity of the user requesting the specified URL, and the DIFF profile information may specify that DIFF information for the specified URL is to be displayed to the user associated with that user ID. In an alternate embodiment, default DIFF profiles may exist for selected URLs. The default DIFF profiles may include default information for displaying or not displaying DIFF information for particular URLs if the user ID is unknown or if there is no DIFF display preference information for an identified user ID.

If it is determined that the DIFF profile includes instructions for the display of DIFF information to the identified user, the web page content is processed (518) and displayed according to the DIFF profile information. If, however, it is determined that the DIFF profile does not include instructions for the display of DIFF information to the identified user, the user may be notified (512) of the availability for DIFF information to be displayed. The user may then input (514) instructions for the user's preference regarding the display of DIFF information for the specified URL. The user instructions may be stored (516) in a DIFF profile associated with the specified URL and/or user ID. Thereafter, the web page content for the specified URL may be processed (518) and displayed according to the DIFF profile information.

Figure 6:
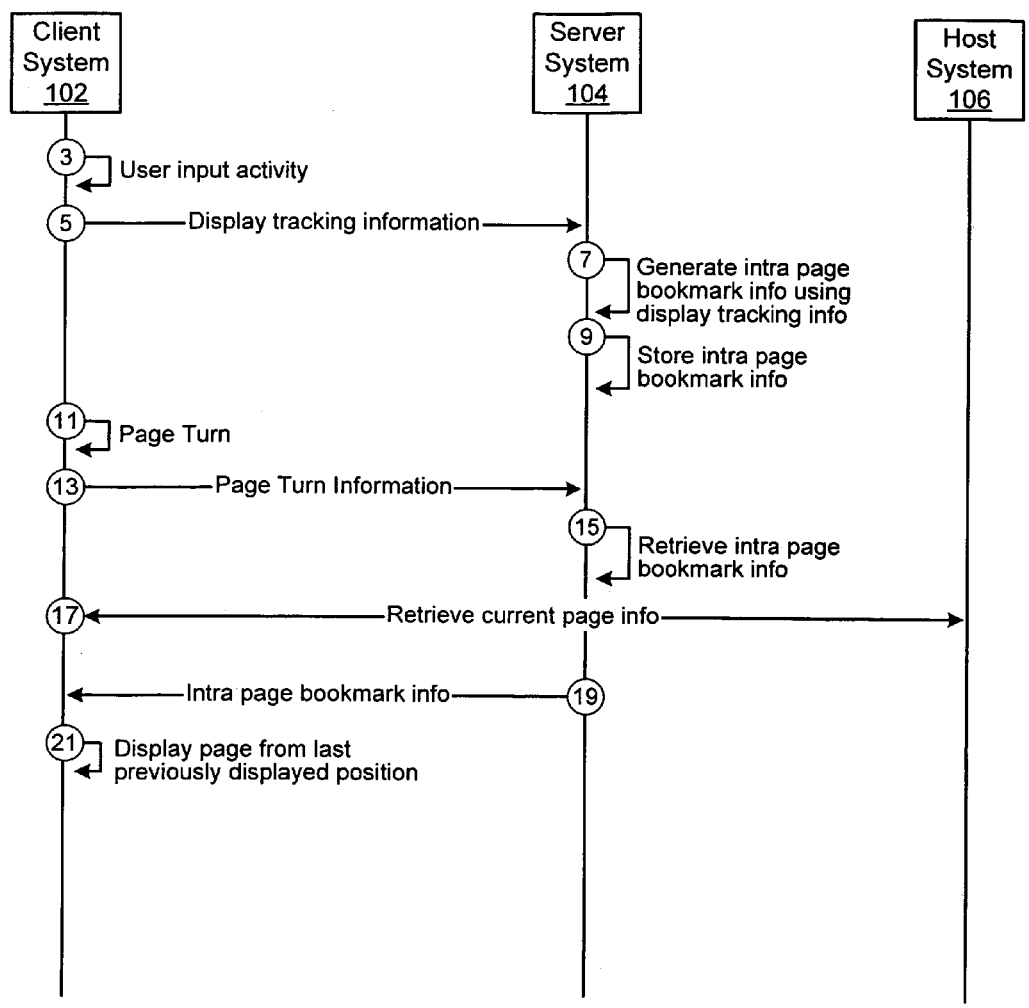
FIG. 6 shows a flow diagram illustrating a specific embodiment of the present invention for implementing an "intra page bookmark" technique of the present invention.

FIG. 6 shows a flow diagram illustrating a specific embodiment of the present invention for implementing an "intra page bookmark" technique of the present invention. According to at least one embodiment, the intra page bookmark technique of the present invention enables a user to bookmark a desired location or position within a given web page (corresponding to a particular URL) in a manner which allows the user to subsequently retrieve the web page, and display the retrieved web page content starting at the desired location/position specified by the user.

In the example of FIG. 6 it is assumed that web page content corresponding to a specific URL is being displayed to a user on client system 102. The user is able to scroll up/down the displayed web page by inputting (3) desired scrolling/browsing information into the client system using, for example, a keyboard and/or mouse. The client system responds to the user input activity by adjusting the relative position of the displayed portion of web page content. For example, the user may desire to view a web page which includes 100 lines of text. The display is capable of showing 30 lines of text at any one time. When the pages first loaded, lines 1-30 are displayed to the user. The user then hits the PAGE DOWN key on the client system keyboard, whereupon the client system responds by displaying lines 31-60 of the web page. In order to properly display the web page content to the user, the client system is configured or designed to generate display tracking information relating to the relative position within the web page which is currently being displayed to the user. Such display tracking information may include, for example, one or more pointers relating to the relative position within the web page which is currently being displayed to the user.

According to at least one implementation, the client-side application 102*b* may be configured or designed to transmit (5) at least a portion of the display tracking information to server system of 104. Alternatively, at least a portion of the display tracking information may be stored locally at the client system. According to one embodiment, the display tracking information may include, for example, display pointer information, URL information, user ID information, toolbar ID information, timestamp information, etc. Using the received display tracking information, intra page bookmark information may then be generated (7). According to one implementation, the intra page bookmark information may include information relating to the web page URL, user ID, and/or the last known location or position of the web page which was displayed to the user. According to different embodiment, at least a portion of the intra page bookmark information may be stored at the server system of 104 and/or client system 102. In one implementation, URL information and/or user ID information associated with the display tracking information may also be stored along with the intra page bookmark information.

At (11) it is assumed that the user initiates a page turn request at client system 102. At least a portion of the page turn information may be transmitted (13) from client system 102 to server system 104. According to one embodiment, the page turn information may include, for example, user ID information (if available), toolbar ID information, time stamp information, URL information, etc. Using the received page turn information, intra page bookmark information for the identified URL and user ID may be retrieved (15) (if available) from the server system 104 (and/or client system 102). According to at least one embodiment, the retrieved intra page bookmark information may be provided to the client-side application 102*b*, which may use the intra page bookmark information to cause the retrieved web page content to be displayed (25) from the last known position or location that was previously displayed to the user.

It will be appreciated that the intra page bookmark technique of the present invention enables a user to bookmark a desired location or position within a given web page (corresponding to a particular URL) in a manner which allows the user to subsequently retrieved a desired web page (corresponding to a particular URL), and to display the retrieved web page starting at the desired location/position specified by the user. In contrast, conventional Internet bookmark techniques allow users to retrieve a desired "bookmarked" web page (corresponding to a particular URL). However, the retrieved web page will be displayed starting at the top portion of the web page. Conventional Internet bookmark techniques do not provide the user with the capability to specify the position or location of the initial display of a retrieved web page. Moreover, although it is possible for conventional web page content to contain "anchors" (which are references to specific portions of a web page), such anchors are typically defined and placed by the author of the web page document, not the user. In contrast, the technique of the present invention allows users (e.g., a user at client system 102) to define and/or set their own "internal anchor" bookmarks using, for example, the intra page bookmark technique of the present invention.

FIG. 7 shows an example of a user record 700 which may be used for storing personal information and/or web browsing information associated with a particular user. According to a specific embodiment, the user record 700 may include a variety of different information such as, for example: user ID information 702; IP address information 704; timestamp information 706; toolbar ID information 708; URL information 710; DIFF related information 712 (e.g., DIFF profile information, information relating to web page content previously displayed to the user, etc.); intra page bookmark information 714; user geographical location information 716; credit card information 718; user purchase history information 720; user profile information 722 (e.g., name, address, e-mail address, age, etc); user browsing activity information 724; user preference information 726; other information 728, etc.

FIG. 9 shows an example of weblog page related content 900 which has been formatted using a standardized RSS format. As illustrated in the example of FIG. 9, the weblog page content 900 includes a plurality of different entries (e.g., 902*a*, 902*b*, 902*c*). As shown in the example of FIG. 9, each entry 902 includes an associated URL portion 904, and an associated timestamp portion 906. According to at least one embodiment, DIFF information for the weblog page may be determined, for example, by comparing the timestamp information from a previously stored version of the weblog content to the timestamp information provided in the RSS feed of the current weblog content. A detailed discussion of RSS standards is described in the book entitled, *CONTENT SYNDICATION WITH RSS*, by Ben Hammersley, O'Reilly & Associates, California, 2003, herein incorporated by reference in its entirety for all purposes.

It will be appreciated that alternative syndication formats may also be used, such as, for example, RDF, ATOM, etc. A more detailed description of the Atom Syndication Format may be found in the online document entitled, "DRAFT-NOTTINGHAM-ATOM-FORMAT-02", by M Nottingham, 2003 (www.atomenabled.org), which is herein incorporated by reference in its entirety for all purposes.

Further, it will be appreciated that the technique of the present invention may be used for determining modifications/changes any type of markup document. According to at least one implementation, the term "markup document" may include any document content, and/or portion thereof which is able to be rendered by a web browser application. Examples of markup documents include web pages, HTML documents, XML documents, etc.

In at least one embodiment, the technique of the present invention may also be used for determining modifications/ changes to other types of documents, files, and/or content other than that associated with web pages. For example, the technique of the present invention may also be used to facilitate a user in identifying modifications/changes to text documents, images, files including rich media content, etc. For example, other types of documents may include word processing files, structured document files, RSS feeds, etc.

Other Embodiments

Generally, the web page modification techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the web page modification technique of this invention may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. Specific examples of such network devices include routers and switches. For example, the computer network devices of this invention may be specially configured routers or servers. A general architecture for some of these machines will appear from the description given below. In an alternative embodiment, the web page modification technique of this invention may be implemented on a general-purpose network host machine such as a personal computer or workstation. Further, the invention may be at least partially implemented on a card (e.g., an interface card) for a network device or a general-purpose computing device.

Figure 8:
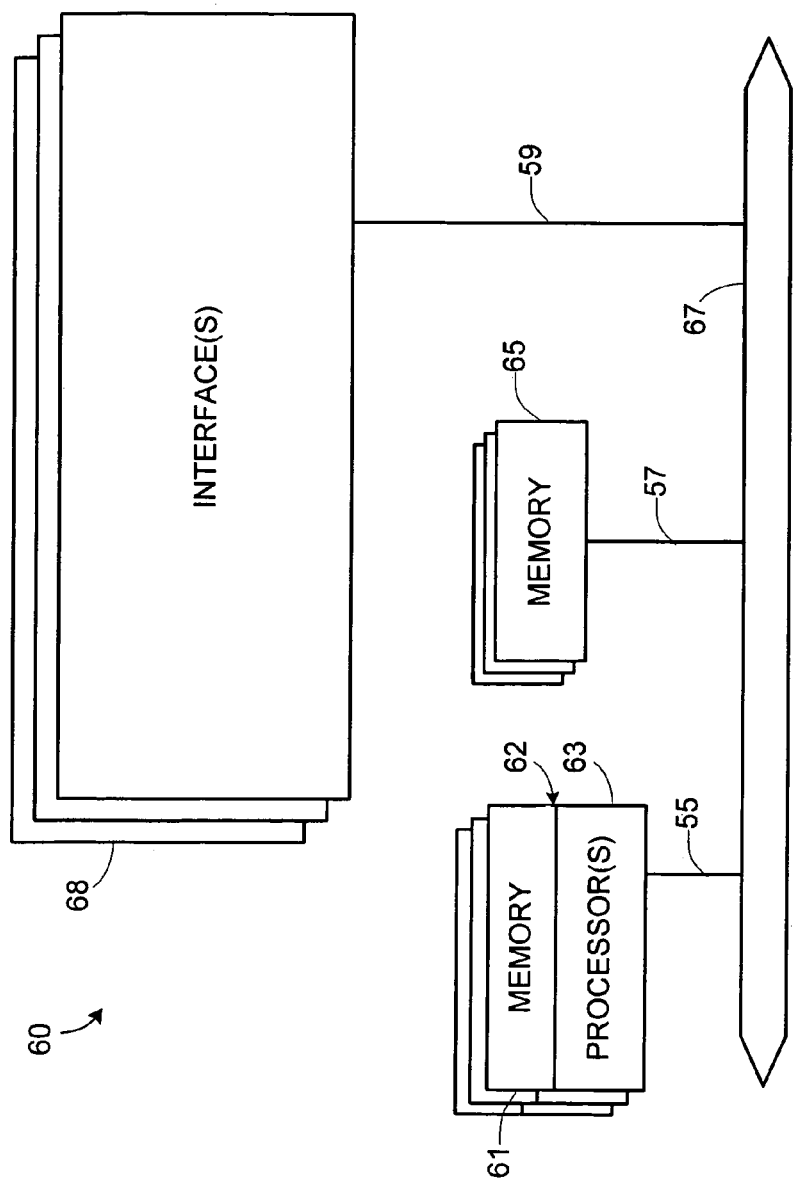
FIG. 8 shows a specific embodiment of a network device 60 suitable for implementing the web page modification techniques of the present invention

Referring now to FIG. 8, a network device 60 suitable for implementing the web page modification techniques of the present invention includes a master central processing unit (CPU) 62, interfaces 68, and a bus 67 (e.g., a PCI bus). When acting under the control of appropriate software or firmware, the CPU 62 may be responsible for implementing specific functions associated with the functions of a desired network device. For example, when configured as a server device, the CPU 62 may be responsible for analyzing packets, encapsulating packets, forwarding packets to appropriate network devices, generating and storing DIFF information, etc. The CPU 62 preferably accomplishes all these functions under the control of software including an operating system (e.g. Windows NT), and any appropriate applications software.

CPU 62 may include one or more processors 63 such as a processor from the Motorola or Intel family of microprocessors or the MIPS family of microprocessors. In an alternative embodiment, processor 63 is specially designed hardware for controlling the operations of network device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 8 illustrates one specific network device of the present invention, it is by no means the only network device architecture on which the present invention can be implemented. For example, an architecture having a single processor that handles communications as well as routing computations, etc. may be used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the web page modification techniques described herein. The program instructions may control the operation of an operating system and/or one or more applications, for example. The memory or memories may also be configured to store data structures, DIFF related information, intra page bookmark information, and/or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

The invention claimed is:

1. A computer-implemented method for modifying a display of content that includes a first portion that was previously displayed to a user, the method comprising:
under control of one or more computer systems configured with executable instructions,
receiving a request for content to be displayed to a user, the content being associated with a markup document that is associated with a first URL such that the content is retrievable by accessing the markup document from a location specified by the first URL;

retrieving the content associated with the markup document;

determining if difference information is available, the difference information indicating a difference between a previous version and a current version of the markup document, the previous version having been presented to the user;

accessing user activity tracking information to determine portions of the markup document that were previously displayed to the user;

based on the difference information and the user activity tracking information, determining portions of the current version of the markup document that have not previously been displayed to the user;

providing the markup document for display to the user at a client system, the content of the markup document including one or more intra page bookmarks indicating portions of the content that were not previously displayed to the user;

enabling the user to use the intra page bookmarks to view the portions of the markup document that were not previously displayed to the user;

enabling the user to manually insert intra page bookmarks in the markup document allowing the user to start at a desired location after closing the markup document; and enabling the user to selectively choose to display or not display the intra page bookmarks.

2. The method of claim 1, wherein the markup document content includes content selected from a group of HTML content and XML content.

3. The method of claim 1, wherein the user activity tracking information includes information for an action corresponding to a page turn operation.

4. The method of claim 1, wherein the markup document corresponds to a weblog page.

5. The method of claim 1, wherein said providing includes formatting the first portion differently than the second portion.

6. The method of claim 1, wherein said providing includes adding to the markup document a graphical indicator that identifies the second portion.

7. The method of claim 6, wherein the graphical indicator includes text.

8. The computer-implemented method of claim 1, further comprising:

storing user preference data, the user preference data at least including automatically highlighting previously not displayed portions of the content based on user preference.

9. The computer-implemented method of claim 1, wherein the user activity tracking information is stored on the client system or on a remote server.

10. The computer-implemented method of claim 1, wherein at least one previous version of the markup document is stored in at least one of the client system and a server remote from the user.

11. A system for modifying a display of content that includes a first portion that was previously displayed to a user and that is capable of including a portion that was part of the content at the time the first portion was previously displayed to the user, but that has yet to be displayed to the user, the system comprising:

at least one processor;

at least one interface configured or designed to provide a communication link to at least one other network device in the data network; and memory including instructions that, when executed by the at least one processor, cause the system to:

receive a request for content to be displayed to a user, the content being associated with a markup document that is associated with a first URL such that the content is retrievable by accessing the markup document from a location specified by the first URL;

retrieve the content associated with the markup document;

determine difference information indicating any differences between a previous version and a current version of the markup document, the previous version having been previously presented to the user;

access user activity information to determine portions of the markup document that were previously displayed to the user;

based on the difference information and the user activity information, determine portions of the current version of the markup document that have not previously been displayed to the user;

provide the markup document for display to the user at a client system, the content of the markup document including one or more intra page bookmarks indicating portions of content that were not previously displayed to the user; and enable the user to use the intra page bookmarks to locate the portions of the markup document that were not previously displayed;

enable the user to manually insert intra page bookmarks in the markup document allowing the user to start at a desired location after closing the markup document; and enable the user to selectively choose to display or not display the intra page bookmarks.

12. The system of claim 11, wherein the markup document content includes content selected from a group of HTML content and XML content.

13. The system of claim 11, wherein the user activity tracking information includes information for an action corresponding to a page turn operation.

14. The system of claim 11, wherein the first portion of content includes a fingerprint of markup document content which has been previously displayed to the user.

15. The system of claim 11, wherein the markup document corresponds to a weblog page.

16. The system of claim 11, further comprising:

store user preference data, the user preference data at least including automatically highlighting previously not displayed portions of the content based on user preference.

17. The system of claim 11, wherein at least one previous version of the markup document is stored in at least one of the client system and a server remote from the user.

18. A non-transitory computer-readable storage medium encoded with a computer program product for modifying a display of content that was previously displayed to a user, the computer program product comprising executable instructions for:

receiving a request for content to be displayed to a user, the content being associated with a markup document;

retrieving the content associated;

obtaining difference information for the markup document when a current version of the markup document has not been displayed to the user, the difference information indicating a difference between the current version and a previous version of the markup document that was presented to the user;
accessing user activity tracking information to determine portions of the markup document that were previously displayed to the user;
based on the difference information and the user activity tracking information, determining portions of the current version of the markup document that have not previously been displayed to the user;
providing the markup document for display to the user at a client system, the content of the markup document being modified to include intra page bookmarks, such that the portion that was not previously displayed to the user is distinguished from the portion that was previously displayed in a manner enabling the user to locate and view the portion that was not previously displayed to the user;
enabling the user to manually insert intra page bookmarks in the markup document allowing the user to start at a desired location after closing the markup document; and
enabling the user to selectively choose to display the intra page bookmarks.

19. A computer-implemented method for facilitating a display of markup document content retrieved from a host server on a computer network, the computer network including a client system and a server system, the method comprising:
receiving a request to retrieve content in response to an action by a user of the client system, the content being associated with a markup document that is associated with a first URL such that the content is retrievable by accessing the markup document from a location specified by the first URL;
retrieving a first portion of content associated with a previous version of the markup document associated with the first URL, wherein at least a portion of the first portion of content was previously displayed to the user on the client system;
retrieving a second portion of content associated with a current version of the markup document associated with the first URL, wherein at least a portion of the second portion of content was not previously displayed to the user on the client system;
comparing the first portion of content associated with the previous version of the markup document with the second portion of content associated with the current version of the markup document using user activity tracking information to identify a third portion of content associated with the markup document, the third portion including content in the current version which was not previously displayed to the user and capable of including content from the previous version that was not previously displayed to the user on the client system;
inserting an intra page bookmark into the content associated with the markup document indicating the location of the third portion of the content associated with the markup document;
enabling the user to use the intra page bookmark to identify and view the third portion of the markup document that was not previously displayed;
storing user preferences associated with the display of the third portion of the content, wherein the user is able to selectively turn on and off the intra page bookmark; and
enabling the user to manually insert intra page bookmarks in the markup document to allow the user to start at a desired location after closing the markup document.

20. The method of claim 19, further comprising displaying the markup document content to the user starting from a location within the markup document where the first portion of content associated with the previous version of the markup document was last displayed to the user.

21. The method of claim 19, wherein the intra page bookmark includes highlighting a portion of the markup document content displayed to the user, wherein the highlighted portion corresponds to the first portion of content associated with the previous version of the markup document that was last displayed to the user.

22. The method of claim 19, wherein:
the markup document corresponds to a weblog page;
the first portion of content includes information relating to a previous version of the weblog page content that had been previously displayed to the user;
the second portion of content includes information relating to a current version of the weblog page content; and
a third portion of content includes information relating to new or modified weblog page content which was not previously displayed to the user.

23. The method of claim 22, further comprising initially displaying the third portion of content to the user in response to the action.

24. The method of claim 22, further comprising:
highlighting a portion of the weblog page content to be displayed to the user, wherein the highlighted portion corresponds to a portion of the weblog page content that was last displayed to the user the last time that the user viewed the weblog page; and
initially displaying the weblog page to the user, in response to the action, starting from a location corresponding to the highlighted portion of content.

25. A system for facilitating a display of markup document content retrieved from a host server on a computer network, the computer network including a client system and a server system, the system comprising:
at least one processor;
at least one interface configured or designed to provide a communication link to at least one other network device in the data network; and
memory including instructions that, when executed by the at least one processor, cause the system to:
receive a request to retrieve content in response to an action by a user of the client system, the content being associated with a markup document that is associated with a first URL such that the content is retrievable by accessing the document from a location specified by the first URL;
retrieve a first portion of content associated with a previous version of the markup document associated with the first URL, wherein at least a portion of the first portion of content was previously displayed to the user on the client system;
retrieve a second portion of content associated with a current version of the markup document associated with the first URL, wherein at least a portion of the second portion of content was not previously displayed to the user on the client system;
access user activity tracking information to determine portions of the markup document that were previously displayed to the user;
compare the first portion of content associated with the previous version of the markup document with the second portion of content associated with the current version of the markup document using the user activity tracking information to identify a third portion of content associated with the markup document, the third portion including content in the current version which was not previously displayed to the user and capable of including content from the previous version which was not previously displayed to the user;

provide the markup document for display to the user at a client system, the content of the markup document including one or more intra page bookmarks in the third portion indicating a location of content that was not previously displayed to the user;

enable the user to use the intra page bookmarks to identify and view the portions of the markup document that were not previously displayed;

enable the user to manually insert intra page bookmarks in the markup document allowing the user to start at a desired location after closing the markup document; and enable the user to selectively choose to display the intra page bookmarks.

26. The system of claim 25, being further configured to display the markup document content to the user starting from a location within the markup document where the first portion of content associated with the previous version of the markup document was previously displayed to the user.

27. The system of claim 25, being further configured to highlight a portion of markup document content displayed to the user, wherein the highlighted portion corresponds to the first portion of content associated with the previous version of the markup document that was last displayed to the user.

28. The system of claim 25, wherein the markup document corresponds to a weblog page:
wherein the first portion of content includes information relating to a previous version of the weblog page content that had been previously displayed to the user;
wherein the second portion of content includes information relating to a current version of the weblog page content;
wherein the third portion of content includes information relating to new or modified weblog page content that was not previously displayed to the user.

29. The system of claim 28, being further configured or designed to initially display the third portion of content to the user in response to the action.

30. The system of claim 28, being further configured or designed to:
highlight a portion of weblog page content to be displayed to the user, wherein the highlighted portion corresponds to a portion of the markup document content that was last displayed to the user a last time that the user viewed the weblog page; and
initially display the weblog page to the user, in response to the action, starting from a location corresponding to the highlighted portion of content.

31. A non-transitory computer-readable storage medium encoded with a computer program product for facilitating a display of markup document content retrieved from a host server on a computer network, the computer network including a client system and a server system, the computer program product comprising executable instructions for:
receiving a request for content to be displayed to a user, the content being associated with a markup document that is associated with a URL such that the content is retrievable by accessing the markup document from a location specified by the URL;
retrieving a first portion of content associated with the markup document associated with the URL, wherein at least a portion of the first portion of content was previously displayed to the user on the client system;
retrieving a second portion of content associated with a current version of the markup document associated with the URL, wherein at least a portion of the second portion of content was not previously displayed to the user on the client system;
accessing user activity tracking information to determine portions of the markup document that were previously displayed to the user;
comparing the first portion of content associated with the markup document with the second portion of content associated with the current version of the markup document to identify a difference portion of content associated with the markup document;
based on the difference portion of content and the user activity tracking information, determining a portion of the current version of the markup document that has not previously been displayed to the user;
causing portion of the current version of the markup document that has not previously been displayed to the user to be distinguished from the previously displayed portion using one or more intra page bookmarks;
providing the markup document for display to the user at a client system enabling the user to identify and view the portions of the markup document that were not previously displayed;
enabling the user to manually insert intra page bookmarks in the markup document allowing the user to start at a desired location after closing the markup document; and
enabling the user to selectively choose to display the intra page bookmarks.

32. The non-transitory computer-readable storage medium of claim 31, encoded with a computer program product, the computer program product further comprising:
components for displaying the markup document content to the user starting from a location within the markup document where the first portion of content associated with the markup document was last displayed to the user.

33. The non-transitory computer-readable storage medium of claim 31, encoded with a computer program product, the computer program product further comprising:
components for highlighting a portion of markup document content displayed to the user, wherein the highlighted portion corresponds to the first portion of content associated with the markup document that was last displayed to the user.

34. The non-transitory computer-readable storage medium of claim 31, encoded with a computer program product, wherein:
the first markup document corresponds to a weblog page;
the first portion of content includes information relating to a previous version of the weblog page content that had been previously displayed to the user;
the second portion of content includes information relating to a current version of the weblog page content; and
the difference portion of content includes information relating to new or modified weblog page content that was not previously displayed to the user.

35. The non-transitory computer-readable storage medium of claim 34, encoded with a computer program product, the computer program product further comprising:
components further configured or designed to initially display the difference portion of content to the user in response to the action.

36. The non-transitory computer-readable storage medium of claim 34, encoded with a computer program product, the computer program product further comprising:
components further configured or designed to:
highlight a portion of weblog page content to be displayed to the user, wherein the highlighted portion corresponds to a portion of the markup document content that was last displayed to the user a last time that the user viewed the weblog page; and initially display the weblog page to the user, in response to the action, starting from a location corresponding to the highlighted portion of content.

37. A computer-implemented method for facilitating a display of markup document content retrieved from a host server on a computer network, the computer network including a client system and a server system, the method comprising:

tracking interaction of a user with the markup document;

storing user activity tracking information for the user with respect to the markup document;

in response to receiving a request corresponding to an action by a user of the client system, the request corresponding to a URL associated with the markup document such that the markup document is accessible from a location specified by the URL:

retrieving content associated with the markup document associated with the URL, wherein at least a portion of the content was previously displayed to the user on the client system;

determining if difference information is available, the difference information indicating a difference between a previous version and a current version of the markup document, the previous version having been presented to the user;

accessing user activity tracking information to determine portions of the markup document that were previously displayed to the user;

based on the difference information and the user activity tracking information, determining portions of the current version of the markup document that have not previously been displayed to the user;

providing the markup document for display to the user at a client system, the content of the markup document including one or more intra page bookmarks indicating portions of content that were not previously displayed to the user;

enabling the user to use the intra page bookmarks to view the portions of the markup document that were not previously displayed;

enabling the user to manually insert intra page bookmarks in the markup document allowing the user to start at a desired location after closing the markup document; and enabling the user to selectively choose to display the intra page bookmarks.

38. The method of claim 37, further comprising displaying the markup document content to the user starting from a location within the markup document where the content associated with the markup document was last displayed to the user.

39. The method of claim 37, wherein said intra page bookmarks includes highlighting a portion of markup document content to be displayed to the user, wherein the highlighted portion corresponds to the portion of the markup document that was last displayed to the user.

40. The method of claim 37, wherein the markup document corresponds to a weblog page.

41. The method of claim 40, further comprising:

highlighting a portion of the weblog page content to be displayed to the user, wherein the highlighted portion corresponds to a portion of the weblog page content that was last displayed to the user the last time that the user viewed the weblog page; and initially displaying the weblog page to the user, in response to the action, starting from a location corresponding to the highlighted portion of content.

42. A system for facilitating a display of markup document content retrieved from a host server on a computer network, the computer network including a client system and a server system, the system comprising:

at least one processor;

at least one interface configured or designed to provide a communication link to at least one other network device in the data network; and memory including instructions that, when executed by the processor, cause the system to:

track interaction of a user with the markup document;

store user activity tracking information for the user with respect to the markup document, the user activity tracking information relating to at least one relative position within content associated with the markup document that indicates a first portion of the content associated with a previous version of the markup document that was previously displayed to the user;

receive a request in response to an action by a user of the client system, the action triggering the request corresponding to the markup document;

retrieve content associated with the markup document, wherein at least a portion of the content was previously displayed to the user on the client system;

identify, based at least in part of the user activity tracking information, intra page bookmark information that enables display of the retrieved content associated with the markup document according to the relative position such that said at least a portion of the markup document that was previously displayed to the user is distinguished from another portion of the retrieved content that has yet to be displayed to the user, said another portion that has yet to be displayed to the user being capable of including content that was part of the markup document when said at least a portion of the markup document was previously displayed to the user;

modify, based at least in part on the intra page bookmark information, display information for the markup document such that the portion of the markup document that was previously displayed to the user is distinguished from said another portion in a manner enabling the user to locate a beginning of the second portion;

enable the user to manually insert intra page bookmarks to bookmark a desired location within the markup document, the bookmark allowing the user to start at the desired location after closing the markup document; and enabling the user to selectively choose to display the intra page bookmarks.

43. The system of claim 42, being further configured to display the markup document content to the user starting from a location within the markup document where the content associated with the markup document was previously displayed to the user.

44. The system of claim 42, being further configured to highlight a portion of the markup document content displayed to the user, wherein the highlighted portion corresponds to the portion of content associated with the markup document that was last displayed to the user.

45. The system of claim 42, wherein the markup document corresponds to a weblog page.

46. The system of claim 45, being further configured or designed to:
- highlight a portion of the weblog page content to be displayed to the user, wherein the highlighted portion corresponds to a portion of the markup document content that was last displayed to the user a last time that the user viewed the weblog page; and
- initially display the weblog page to the user, in response to the action, starting from a location corresponding to the highlighted portion of content.

47. A non-transitory computer-readable storage medium encoded with a computer program product for facilitating a display of markup document content retrieved from a host server on a computer network, the computer network including a client system and a server system, the computer program product comprising executable instructions for:
- tracking interaction of a user with the markup document;
- storing user activity tracking information for the user with respect to the markup document, the user activity tracking information to determine portions of the markup document that were previously displayed to the user;
- receiving a request corresponding to an action at the client system, the action being initiated by a user of the client system, the request associated with a first URL such that the markup document is accessible from a location specified by the first URL;
- retrieving content associated with the markup document associated with the first URL, wherein at least a portion of the content was previously displayed to the user on the client system;
- determining if difference information is available, the difference information indicating a difference between a previous version and a current version of the markup document, the previous version having been presented to the user;
- modifying, based on the difference information and the user activity tracking information, display information for the markup document using one or more intra page bookmarks such that the portion of the markup document that was previously displayed to the user is distinguished from said another portion; and
- enabling the user to use the modified display information to identify and view the portions of the markup document that were not previously displayed;
- enabling the user to manually insert intra page bookmarks in the markup document allowing the user to start at a desired location after closing the markup document; and
- enabling the user to selectively choose to display the intra page bookmarks.

48. The non-transitory computer-readable storage medium of claim 47, encoded with a computer program product, the computer program product further comprising:
- components for displaying the markup document content to the user starting from a location within the markup document where the content associated with the markup document was last displayed to the user.

49. The non-transitory computer-readable storage medium of claim 47, encoded with a computer program product, the computer program product further comprising:
- components for highlighting a portion of the markup document content displayed to the user, wherein the highlighted portion corresponds to the portion of content associated with the markup document that was last displayed to the user.

50. The non-transitory computer-readable storage medium of claim 47, wherein the markup document corresponds to a weblog page.

51. The non-transitory computer-readable storage medium of claim 50, encoded with a computer program product, the computer program product further comprising:
- components further configured or designed to:
  - highlight a portion of the weblog page content to be displayed to the user, wherein the highlighted portion corresponds to a portion of the markup document content that was last displayed to the user a last time that the user viewed the weblog page; and
  - initially display the weblog page to the user, in response to the action, starting from a location corresponding to the highlighted portion of content.

* * * * *